United States Patent [19]

Ho et al.

[11] Patent Number: 5,062,076
[45] Date of Patent: Oct. 29, 1991

[54] CASCADABLE, HIGH-BANDWIDTH, MULTI-CHANNEL IMAGE TRANSFER CONTROLLER

[75] Inventors: Shu-Kuang Ho, Carlisle; Gilbert W. Agudelo, Malden, both of Mass.

[73] Assignee: Wang Laboratories, Inc., Lowell, Mass.

[21] Appl. No.: 754,116

[22] Filed: Jul. 12, 1985

[51] Int. Cl.⁵ .................... G06F 13/20; G06F 13/40
[52] U.S. Cl. .................... 364/900; 364/926.9; 364/926.93; 364/927.94; 364/927.95; 364/927.99; 364/935; 364/935.3; 364/935.6; 364/935.44; 364/940.61; 364/964; 340/717
[58] Field of Search ........... 364/514, 200 MS File, 364/900 MS File, 717, 798-801, 518-521; 382/1, 6, 41; 379/100, 333, 335; 340/825, 825.01, 825.02, 825.03, 826, 827, 711, 750; 358/256

[56] References Cited

U.S. PATENT DOCUMENTS

| | | | |
|---|---|---|---|
| 3,399,385 | 8/1968 | Gorman et al. | 364/200 |
| 3,409,878 | 11/1968 | Lindinger et al. | 364/200 |
| 3,634,830 | 1/1972 | Baskin | 364/200 |
| 3,639,909 | 2/1972 | Hauck et al. | 364/200 |
| 3,740,463 | 6/1973 | Youngstrom et al. | 360/19.1 X |
| 3,774,158 | 11/1973 | Clark | 340/717 X |
| 3,916,380 | 10/1975 | Fletcher | 340/825.04 |
| 3,961,324 | 6/1976 | Cousin et al. | 364/200 X |
| 4,004,277 | 1/1977 | Gavril | 364/200 |
| 4,028,733 | 6/1977 | Ulicki | 379/100 |
| 4,139,901 | 2/1979 | Ganske et al. | 364/200 |
| 4,191,997 | 3/1980 | Luiz | 364/200 |
| 4,205,780 | 6/1980 | Burns et al. | 235/454 |
| 4,207,609 | 6/1980 | Luiz et al. | 364/200 |
| 4,295,154 | 10/1981 | Hata et al. | 360/19.1 X |
| 4,404,551 | 9/1983 | Howse et al. | 340/711 |
| 4,464,733 | 8/1984 | Misker et al. | 364/900 |
| 4,566,007 | 1/1986 | Richards | 340/826 X |
| 4,587,651 | 5/1986 | Nelson et al. | 370/68 X |
| 4,604,743 | 8/1986 | Alexandru | 370/85 |
| 4,653,112 | 3/1987 | Ouimette | 364/130 X |
| 4,658,299 | 4/1987 | Tanaka et al. | 358/256 |
| 4,688,168 | 8/1987 | Gudaitis et al. | 364/200 |
| 4,704,697 | 11/1987 | Kiremidjian et al. | 340/798 X |
| 4,720,828 | 1/1988 | Jones | 370/85 |

FOREIGN PATENT DOCUMENTS

| | | |
|---|---|---|
| 0009113 | 10/1979 | European Pat. Off. |
| 0035628 | 3/1979 | Japan ............ 340/798 |

OTHER PUBLICATIONS

IBM Technical Disclosure Bulletin, vol. 20, No. 2, Jul. 1977, pp. 816, 817 by M. I. Lilie et al.
J. T. Powers, "Remote-Controlled Terminal Switch and Concentrator", IBM Technical Disclosure Bulletin, vol. 18, No. 11, Apr. 1976, pp. 3828-3829.
P. J. Curlander, "Switched Select Circuit", IBM Technical Disclosure Bulletin, vol. 22, No. 11, Jan. 1980, pp. 3620-3633.
Patent Abstracts of Japan, vol. 9, No. 20, Jan. 26, 1985; (Canon).

Primary Examiner—Gareth D. Shaw
Assistant Examiner—Paul Kulik
Attorney, Agent, or Firm—Michael H. Shanahan

[57] ABSTRACT

A controller for transferring data between a plurality of data storage and retrieval devices and a plurality of computer workstations, and which is especially applicable to transferring bit-mapped image data. The controller responds to requests from a plurality of ports on the controller, connected to computers or similar devices, for connection to selected ones of a plurality of channels connected to the data retrieval devices. The connect request is decoded by the controller, and if the requested channel is available, the controller will interconnect the two devices. The controller allows simultaneous access by any of the ports to any of the channels not being used by another port. The device is in modular form so that a single design can be configured to efficiently operate in different applications. The controller is cascadable to allow larger numbers of devices to be connected. Only four serial data lines are necessary for interfacing with each computer and storage device making the installation of the connections relatively easy and economical.

2 Claims, 10 Drawing Sheets

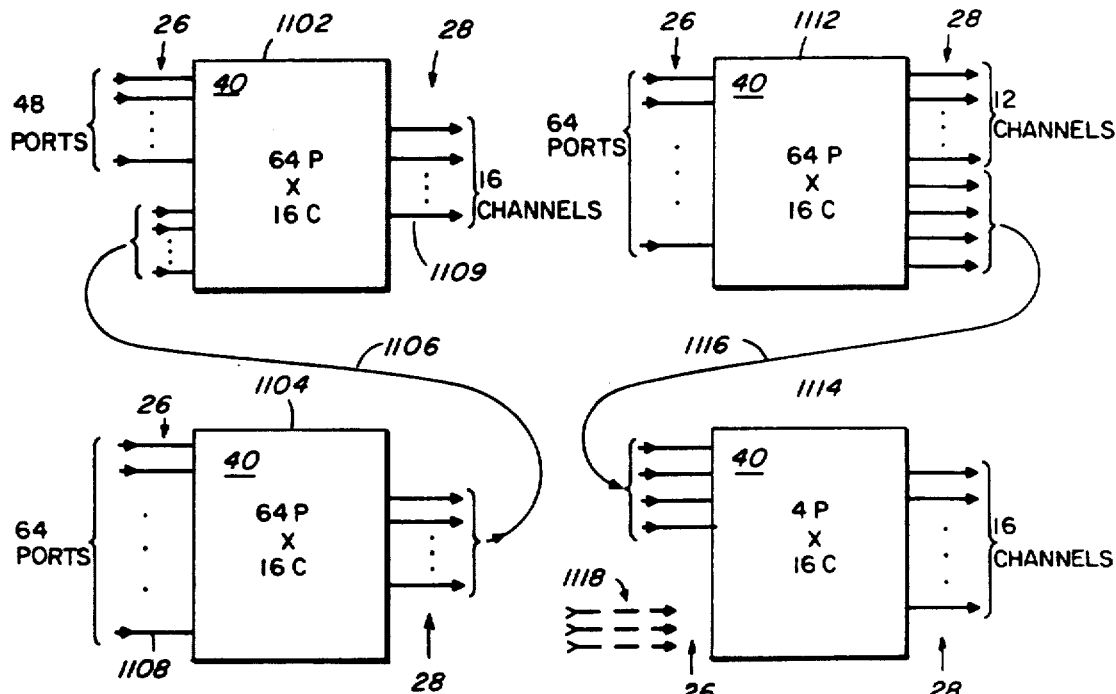
FIG. 11A
FIG. 11B
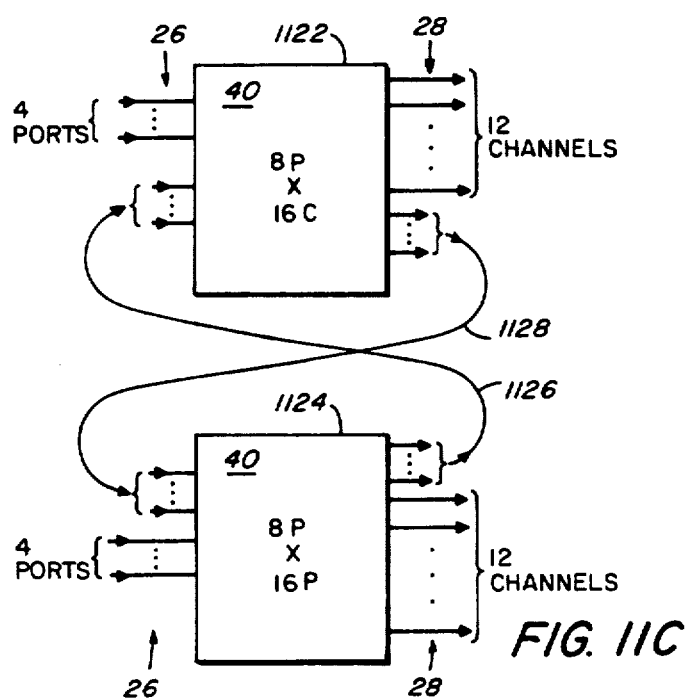
FIG. 11C

CASCADABLE, HIGH-BANDWIDTH, MULTI-CHANNEL IMAGE TRANSFER CONTROLLER

FIELD OF THE INVENTION

This invention is related to switches for providing selective and concurrent connections between a plurality of ports connected to computer workstations and a plurality of channels connected to data storage devices. The invention is especially adapted for use with data storage devices which retrieve large amounts of data in bit-mapped form.

BACKGROUND OF THE INVENTION

High-speed transfer of data has been a subject of much concern recently with the vast increase in the number of computers being used by businesses and individuals. New types of data storage and retrieval devices having higher capacities and data transfer rates are being developed which frequently cannot be efficiently or economically handled by current data transfer systems.

One type of storage device that is becoming more prevalent stores graphic or pictorial images in bit-mapped form. These devices frequently store data in photographic form, such as microfilm or microfiche, which is then scanned by an optical device such as a scanning CCD to generate digital data representing the image. Such devices are capable of storing enormous amounts of information. One typical device of this type is a Microfiche Storage and Retrieval Carousel manufactured by the TERA Corporation. This device can retrieve a page stored in microfiche form and transmit the page as 480 kBytes of data in the form of a bit mapped image of the page. It can store and retrieve the equivalent of 284,000 pages of information, which is the equivalent of about 136,320 megabytes of information.

Interfacing with such devices poses some unusual requirements. Typically, these devices retrieve data in increments of a full page, and thus require that large blocks of data be quickly transferred at one time. In response to a request for data, such a device must mechanically locate and position the image. This takes a significant amount of time ranging from fractions of a second to several seconds.

Furthermore, because of the cost of these types of data storage devices and other considerations, such systems are frequently found in multi-user systems where a plurality of small computers are connected to a central, large computer which provides file and data storage and retrieval services for each user. Because of the practical constraints of such systems, conventional methods of interfacing between the individual personal computers and the optical storage devices do not work well.

Referring to FIG. 1, a typical multi-user system is shown in which a number of small computers 12 serve as terminals or workstations to a much larger computer 14, which is typically a minicomputer or mainframe. Computer 14 usually has a hard disk or other type of device 16 for storing and retrieving large amounts of data to support the multiple workstation computers (WC's). The normal way to interface with a mass storage device (MSD) 30 such as described above is to attach it to the central computer 14 through an appropriate interface 20. The central computer 14 may require a special I/O processor 18 to accomodate the needs of the MSD 30.

Frequently a system configured as shown in FIG. 1 suffers from poor performance when providing data retrieval from an MSD such as described above. In order to accomodate the needs of multiple users, the central computer must constantly switch between the different users, allocating to each user a small block of time. In large systems with many users, the duration of this is on the order of milliseconds. Even with very high data transfer rates, many blocks of time may be required to transfer the data for a single image. Because of the computational overhead required when switching between users, these transfers frequently become very inefficient. This is especially true with interrupt-driven systems.

As a result the effective bandwidth, or tranfer rate of data from the MSD's to the WC's, is much lower than the actual data transfer rate which the system normally can attain. When multiple data channels to the MSD are required to support many simultaneous accesses by multiple users, this problem becomes worse. Additionally, the burden on the central computer imposed by many transfers of large amounts of data may degrade the system performance for all users, whether or not they are trying to access the MSD. Thus, a system for efficiently and economically interfacing a plurality of personal computers to one or more MSD's would be beneficial.

SUMMARY OF THE INVENTION

The present invention includes an image transfer controller which responds to requests from a plurality of computers connected to ports on the image transfer controller for connection to selected ones of a plurality of channels connected to MSD's. The connect request is decoded by the image transfer controller, and if the requested channel is available, the image transfer controller will interconnect the channel and an appropriate port. The image transfer controller allows simultaneous access by any of the ports to any of the channels not being used by another port at an operational data rate of approximately 4 megabits per second. The device is in modular form so that a single design can be configured to efficiently operate in different applications. In the described embodiment, up to 64 ports can be connected with up to 16 channels. The controller is cascadable to allow larger numbers of devices to be connected.

The present invention is especially suited for interfacing with optical-type storage devices such as the microfiche reader described above, which store information in optically-readable form and retrieve the data as bit-mapped images. The controller is capable of achieving extremely high effective bandwidths. The controller may have separate connections to each of the computers, but only four serial data lines are necessary for interfacing with each MSD and WC making the installation of the connections relatively easy and economical.

The device may be easily expanded to be used with MSD's which have the capability of being written to by adding a separate serial line requiring minimal extra circuitry. Thus, the present invention may be used with newly developed types of MSD's which can write as well as read data, such as laser activated storage media.

DESCRIPTION OF THE DRAWINGS

The advantages and operation of the present invention will be more fully appreciated by reading the following description of the preferred embodiment in conjunction with the drawings, of which:

FIGS. 11a, 11b and 11c show how two or more image transfer controllers may be cascaded to increase the number of ports available.

DESCRIPTION OF THE PREFERRED EMBODIMENT

Figure 2:
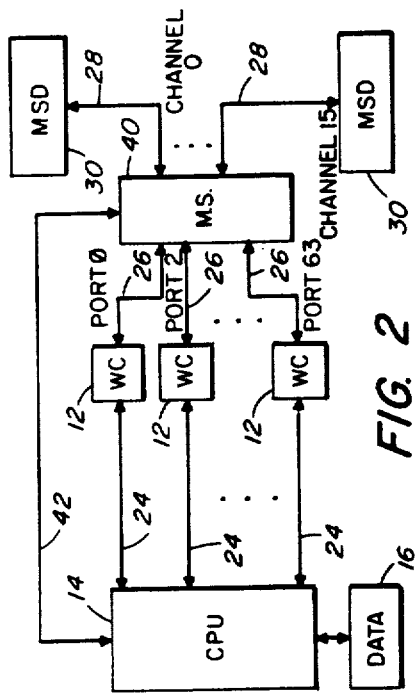
FIG. 2 is block diagram showing the configuration of a system built in accordance with the present invention.

Referring to FIG. 2, there is shown a block diagram illustrating how the present invention is connected to provide data to a plurality of computer work stations from selected ones among a plurality of MSD's.

Figure 1:
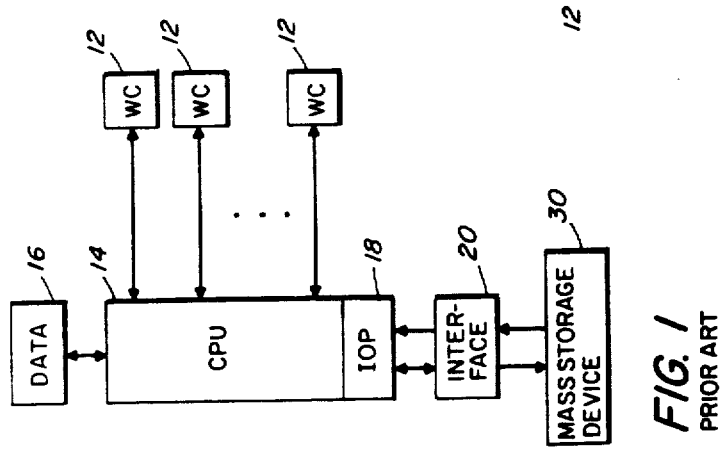
FIG. 1 shows one typical prior art method of interfacing individual computers with one or more MSD's.

In FIG. 2, a plurality of computer workstation computers 12 (designated as WC's in the figs.) are shown connected to a central computer 14. As described in connection with FIG. 1, the central computer provides services to the WC's 12, such as providing data retrieval from a central large data storage unit 16 such as a hard disk, and possibly other services such as time-shared computing. WC's 12 are typically connected to the central computer 14 via high speed data links 24.

The image transfer controller 40 of the present invention includes a plurality of ports 26 which connect to individual WC's. In the described embodiment, up to 64 WC's can be connected to a single image transfer controller 40. The image transfer controller 40 can connect each WC to a selected one of a plurality of channels 28 going to individual MSD's. The channels have a data rate of up to 4 megabits/second, and the described embodiment of the image transfer controller can support up to 16 simultaneous connections between WC's and MSD's, for a total bandwidth through the switch of 64 megabits/sec. An optional serial data link 42 is provided for the image transfer controller. This channel can be used by a central computer 14 to communicate with the switch 40 for diagnostic or other purposes, as described below.

It should be appreciated from the description of the controller module 50 and I/F modules 60 that the maximum number of ports and channels is a function of the design and may be easily modified by one of ordinary skill to accomodate larger or smaller numbers of devices. Furthermore, although the preferred embodiment is described as interfacing with a MSD which retrieves video data, the image transfer controller of the present invention is applicable with other types of data storage devices, and modifying the described embodiment to operate with such different devices is within the ordinary skill of one in the art from the teachings set forth herein.

Figure 3:
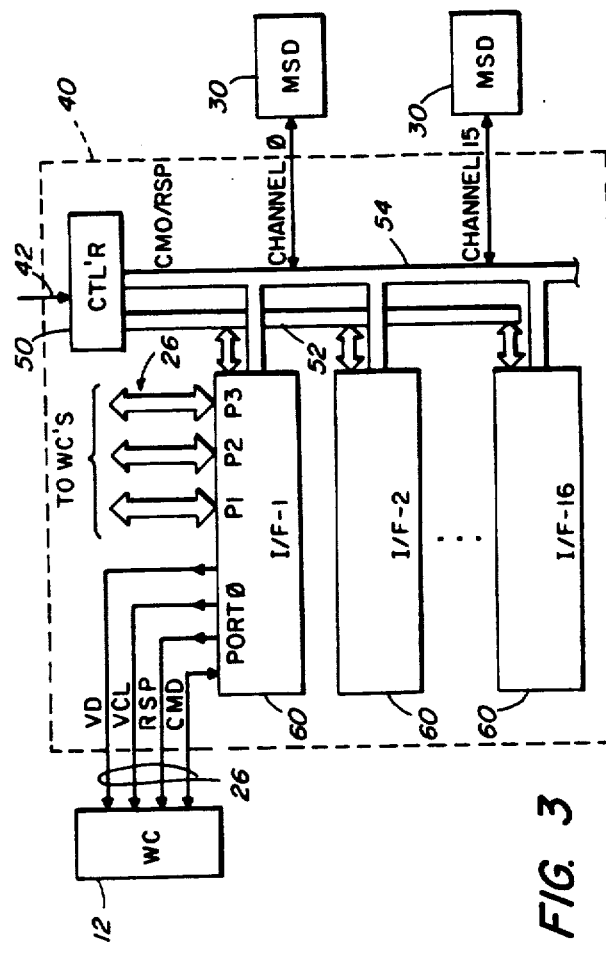
FIG. 3 shows the division of the circuitry into modules in the present invention.

The operation of the image transfer controller will be briefly summarized with reference to FIG. 3 prior to giving a detailed explanation of the switch circuitry and operation. FIG. 3 shows the the individual signals which are routed by the image transfer controller and different modules of the image transfer controller, including switch controller module 50, shown in detail in FIG. 4, and a plurality of interface of I/F modules 60, shown in FIG. 5.

Each I/F module includes four ports, each of which may be connected to an individual WC. Up to 16 I/F modules 60 may be connected to a single controller module 50 in the described embodiment to give a maximum of 64 ports. Typically, each module is on an individual circuit board, and the capacity of the image transfer controller can be quickly configured for individual applications.

The ports and channels each contain 4 lines carrying serial information. These four lines are the only lines which need to be provided between the image transfer controller and the WC's and MSD's. The lines are denoted as the CMD, RSP, VD, and VCL lines and are described below. The CMD and RSP lines are typically conventional serial data lines, such as RS-232 or RS-422 compatible lines, which carry data at a relatively low rate on the order of 1200 to 9600 baud. The VD and VCL lines carry the video data and clock signals at a much higher rate. In the described embodiment, these lines carry data and clock signals at a rate of 4 megabits per second.

Each I/F module communicates with the controller module over a bus 52 which include address lines, data lines, and control lines. Bus 52 is described in detail below in connection with FIGS. 4 and 5. Each module is also connected to a second bus 54 which carries the four lines to each channel connecting to an MSD. The CMD and RSP lines of bus 54 are also connected to the controller module 50.

The command or CMD line carries requests from the WC to the image transfer controller. A WC sends commands over this line which (1) request connection or disconnection to a particular channel and associated MSD, and (2) request particular data from the MSD. The operation of the switch 40 is transparent to the WC's, and there is no difference in the way in which the two different types of signals are sent. The signals on the CMD line are monitored by the controller module 50 for connect and disconnect commands. A response or RSP line goes from the switch 40 to the WC's. On this line are sent signals from the switch 40 or from an MSD connected to a channel acknowledging commands from the WC and giving information as to the successful or unsuccessful completion of the commands. For example, in response to a request for connection to a particular channel, the switch may respond over the RSP line that the connection was successfully made, that the channel is in use by another device, or otherwise as appropriate. After a connection to an MSD is made, responses from the MSD to the WC are sent over the RSP line which similarly indicate the successful or unsuccessful completion of the command.

The VD and VCL lines carry the serial video data and the clock signal for the video data from an MSD to a WC which has been connected to that MSD.

Figure 4:
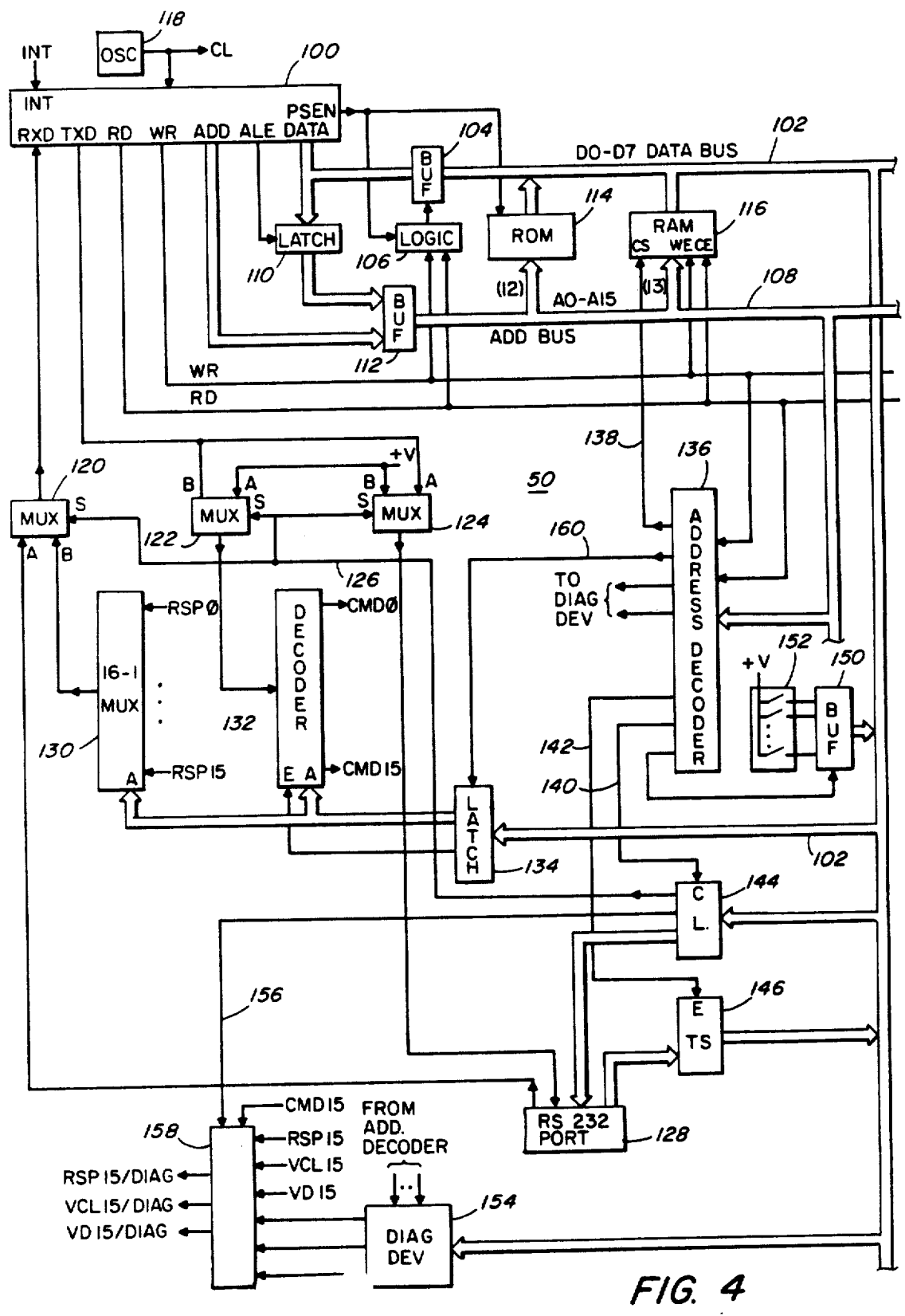
FIG. 4 is a schematic diagram of the switch controller module circuitry.

Referring to FIG. 4, there is shown a block diagram of a preferred embodiment of the controller module 50 of the image transfer controller. The interactions between the various parts of the switch are controlled by a microprocessor or other type of digital processor 100. In the preferred embodiment, processor 100 is implemented by an Intel 8051 microprocessor integrated circuit, and the invention will be described in terms of this microprocessor. The present invention can easily be adapted by one of ordinary skill for use with other microprocessors or other types of computers, however, and the use of a specific microprocessor in the preferred embodiment described herein should not be taken as a limitation on the invention.

Timing signals for the operation of the processor are provided by an oscillator 118 which applies an 8 MHz clock signal to the clock input to processor 100. The clock signal designated CL in FIG. 4 is also applied to other parts of the circuit as described below.

Two multi-line buses are used in the controller for communications between the various parts of the system. These buses are controlled by the processor 100. A data bus 102 has 8 lines in the preferred embodiment and is connected to eight pins on the microprocessor chip designated DATA in FIG. 4. (In the figs., the number of lines for some of the multi-line signals is designated by numbers in parentheses, as for data bus 102.) Data bus 102 transmits data to and from the processor 100. The eight data lines are designated as D0 through D7.

Typically, data bus 102 is driven by one or more tri-state buffers 104. Buffers 104 are bi-directional buffers and serve to prevent the outputs to and from processor from being overloaded. Buffers 104 are enabled and the direction of the buffers is controlled by logic 106. In response to the RD, WR, and PSEN signals from processor 100, logic 106 applies the proper signals to buffers 104, depending on whether the processor is reading from or writing to the data bus.

Processor 100 drives a 16 line address bus 108. The 8051 microprocessor uses eight address lines designated as the ADD outputs and the eight DATA outputs to provide the 16 lines of address data. Eight bits of address data are clocked by an ALE signal from microprocessor 100 into a latch 110 prior to the time period when the address bus is used to designate the addressed circuitry. The eight ADD lines from processor 100 and the eight lines from latch 110 are applied to one or more buffer circuits 112 which drive the address lines. The 16 address lines are designated as A0 through A15.

Processor 100 controls the image transfer controller by carrying out instructions stored in a read only memory (ROM) 114. In the described embodiment, the ROM is an 8K×8 bit PROM, such as a 2764 integrated circuit. The data in ROM 114 is addressed by the lower 13 lines from address bus 108. The outputs from the ROM are tristate outputs which are applied to the data bus 102.

The 8051 processor used in the preferred embodiment is designed to execute programs which are stored in a ROM, and a PSEN signal from the processor indicates when the next instruction bytes are to be read from ROM 114. The PSEN signal is applied to the ROM 114, and in response to the proper signal on the PSEN line, the ROM is enabled.

The processor 100 has a small amount of random access memory (RAM) as part of the integrated circuit. Additional memory is provided by an external RAM 116. Processor 100 provides WR and RD signals which indicate when data is to be read or written. RAM 116 is organized as an 8K by 8-bit storage area. The address information for RAM 116 is taken from the lower 13 bits of 16-bit address bus 108. The address space into which the RAM 116 memory is mapped is separate from the address space where the processor instructions in ROM 114 are stored, and read and write operations indicated by the WR and RD signals from processor 100 are always separate from the reading of instructions from ROM 114.

The upper 4 bits of the address bus are applied to address decoding logic 136, along with the RD and WR lines from processor 100. The address decoding logic monitors these lines and provides individual read and write enable signals for the circuitry described below in response to corresponding addresses on the address bus.

A signal from decoding circuitry 136 is applied on line 138 to RAM 116 to enable the RAM when the top five bits of the address bus indicate that the Ram is to be addressed. Another signal from decoder 136 is applied on line 140 to a latch circuit 144. Data on the data bus lines are clocked into latch 144 to provide the status signals discussed below.

A signal from decoder 136 is applied on line 142 to the enable input of a tri-state buffer 146. Signals from a serial communications port 128 may be read by the processor by reading from the proper address to enable tri-state buffer 146.

Another signal from the decoder is applied to a second set of tri-state buffers 150. The signals from eight switches 152 connected to a high voltage level are applied to the data bus via buffer 150. By putting the proper address signal on the address bus, the processor is able to read the states of switches 152.

The controller may optionally include a diagnostic device 154 for simulating the data from the MSD's. This circuitry may be selected by the processor to aid in doing diagnosis of the image transfer controller system, as discussed below. The particular circuitry used in the diagnostic device depends on the type of signals generated by the particular MSD connected to the image transfer controller of the present invention. Lines from decoder 136 are used to clock data from the data bus into the diagnostic device to initialize it, select between various data patterns, or for other purposes, depending on the type of MSD being used. A signal from latch 144 on line 156 selects between the signals from the MSD connected to channel 15 and the signals from the diagnostic device. Thus, by changing the signal on line 156, processor 100 can substitute the signals from diagnostic device 154 for the signals from the MSD connected to channel 15.

Processor 100 includes a universal asynchronous receiver and transmitter (UART) used for serial communications. The transmitted and received data from the processor UART come from and are applied to the TXD output and RXD input respectively. The UART speed is based on the CL signal and is reduced in frequency by a timer internal to the processor which is initialized during the start-up of the image transfer controller.

Three 2-to-1 multiplexers 120, 122, and 124 select between two different paths for the processor UART. These multiplexers are controlled by a signal on line 126. When the signal on line 126 is high, the multiplexers apply the signal on their A inputs to their outputs, which connects the RXD and TXD terminals on processor 100 to the received data and transmitted data lines of an external, serial communications port 128. In the described embodiment, this port is an RS-232 port, although other serial communications protocols may be used.

When the signal on line 126 is low, the processor UART is connected to the command and response lines of a selected one of the 16 MSD channels so that the processor may send signals to and receive signals from a selected MSD. The selected channel is determined by a 5-bit latch circuit 134. The four address lines to multiplexer 130 and decoder 132 are driven by four outputs from latch circuit 134. Data is clocked into the latch from the data bus via the signal on line 160 from decoder 136. A fifth bit of information is stored in latch 134 and is used to disable 1-of 16 decoder circuit 132.

The RSP response lines from each of the 16 MSD channels are each applied to a 16-to-1 multiplexer 130. The CMD command lines to each of the channels are connected to respective outputs of a 1-of-16 decoder 132. When serial communication with the MSD's is selected, the processor loads data into latch 134 designating the desired channel and then puts a low level on line 126 to multiplexers 120, 122, and 124.

When the signal on line 126 is low, the output from 16-to-1 multiplexer 130 is applied via multiplexer 120 to the RXD input to the processor UART. The output from the processor UART is applied to an enable input to decoder 132 via multiplexer 122. The selected output of the decoder switches between high and low states in response to the data from the TXD output. A high signal is applied to the input of either port 128 or decoder 132 by multiplexers 122 and 124 when the other device is selected. In this manner, processor 100 can communicate directly with each of the individual MSD's.

Figure 5:
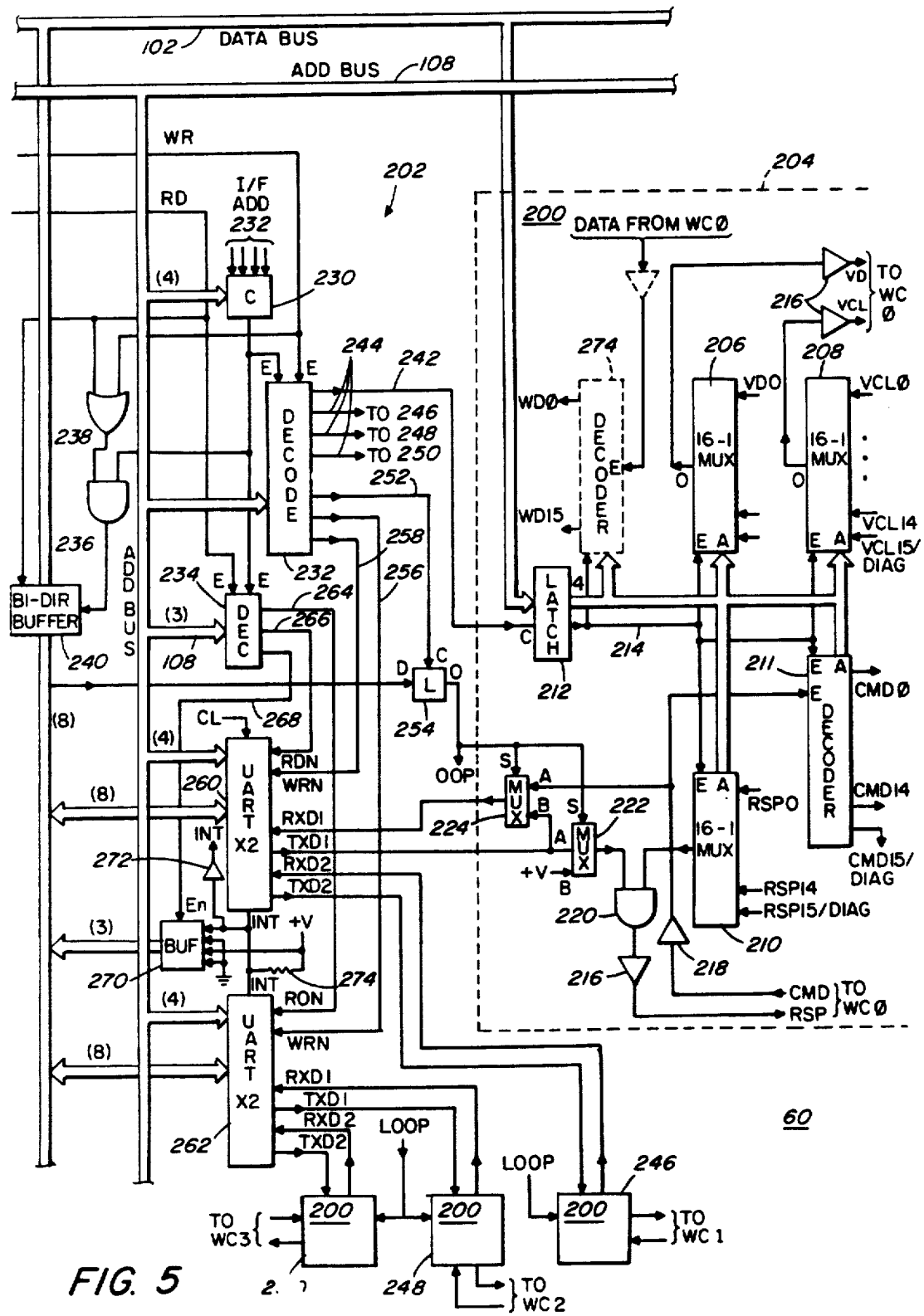
FIG. 5 is a schematic diagram of one of the I/F modules for connecting individual computers to a plurality of MSD's.

FIG. 5 shows the circuitry contained by each of the I/F modules. The processor communicates with the I/F modules via the address bus 108 and data bus 102. The circuitry described allows each WC to be directly connected to a particular MSD channel. The switch controller 50 monitors all communication between the WC's and the MSD's. In response to signals indicating that a channel should be connected or disconnected, the switch controller 50 sends signals to the proper I/F module.

Other signals to and from the MSD's are monitored, and processor 100 may do additional things with this information, depending on the application. For example, the processor could keep track of the last item accessed by each MSD connected to each channel by storing the apropriate data in RAM 116. The processor would then transmit this information back to a WC in response to a request. This information would be helpful, for example, if a WC program were trying to optimize access speed to several different items stored by the MSD's.

I/F control circuitry 202 is controlled by signals on the data and address buses. Four address lines, A8 through A11 on the address bus are applied to the first inputs to a 4-bit digital comparator circuit 230. A second set of four bits designates the I/F address 232 and is applied to the second inputs to comparator 230. The I/F address is different for each I/F module. The address may be selected by switches or by other means. In the described embodiment, each I/F module 60 is on a separate circuit board, and the I/F address is determined by hardwiring a different digital address to four pins on the connectors to each board which provides the signals 232 to comparator 230. This gives a maximum of 16 I/F modules and 64 WC's that can be accomodated in the described system. It should be appreciated that the present invention may be implemented with fewer or more I/F address lines to implement modules of different sizes and capacities.

If the I/F address 232 matches the four bits of address bus 108 applied to comparator 230, the output of comparator goes high. The output of the comparator is applied to enable inputs to 1-of-8 decoder circuits 232 and 234 and to an AND gate 236. The WR signal from processor 100 is applied to a second enable input of decoder 232, and the 3 lowest bits of address data A0–A2 from address bus 108 are applied to its address inputs. Decoder 232 provides several signals enabling the processor to write data to various circuits in the I/F module, as described below. In a similar manner, the RD signal from processor 100 is applied to a second enable input of decoder 234, and the A0–A2 address lines from address bus 108 are applied to its address inputs. Decoder 234 provides at its output signals allowing processor 100 to read data from the I/F module.

The RD and WR signals are combined by an OR gate 238, and the output of OR gate 238 is ANDed with the output from comparator 230 by gate 236. The output from AND gate 236 enables bi-directional buffer circuit 240 connected to the data bus 102. The RD signal is applied to the direction input to buffer 240. Buffer 240 is enabled only when processor 100 is communicating with that I/F module to reduce loading on the data bus.

Each I/F module has four ports for communicating with a WC, and each of these ports has an associated switching circuit 200. In FIG. 5, the circuitry of switching module 204, connected to the port to WC∅, is shown in detail. Switching circuits 246, 248, and 250 go to ports WC1–WC3 and contain circuitry 200 identical to that shown in detail for switching circuit 204.

A signal from decoder 232 on line 242 clocks 5 bits of data from the data bus into latch 212. This data determines to which MSD the WC associated with module 204 is connected, as described below. Three similar lines 244 are applied to modules 246, 248, and 250 to individually clock MSD channel data into these modules.

Two lines 256 and 258 from decoder 232 are applied to the WRN write enable inputs to two dual UART's 260 and 262. Each of the four ports on the I/F modules has a dedicated UART which is used to allow processor 100 to monitor the CMD signals from the port and to send signals to the port on the RSP line. In the described embodiment, these UART's are implemented by means of Signetics 2681 dual UART integrated circuits. These circuits provide two independent UART's which have separate receive and transmit connections for the serial ports and which share a single parallel port for reading and writing data to and from the status, set-up, and data registers.

Two lines 264 and 266 from decoder 234 are applied to the RDN read enable inputs to dual UART's 260 and 262. The A4–A7 address lines are applied to address inputs on the UARTs and the data bus is applied via buffers 240 to the UART data lines. This allows the processor to address the status, data in, data out, and initialization registers in the UART. The signals on lines 256 and 258 enable data to be written into these registers on each of the two dual UART's in conjunction with the address data on the address bus. Signals from decoder 234 are used to allow processor 100 to read data from the UART's.

Decoder 234 applies a third signal on line 268 to the enable input of a tri-state buffer 270. Buffer 270 applies four inputs to the data bus. The bottom three bits are wired with a pattern having both high and low levels. This data is used by processor 100 during initialization to determine which ones of the 16 possible I/F modules 60 are installed. If a module is installed, processor 100 will read the pattern of high and low bits when the slot corresponding with that module is addressed and the data in buffer 270 is read. The fourth bit applied to the data bus by buffer 270 is the INT output from the two dual UART's which can also be read by processor 100.

The switching of signals between the WC's and MSD's is controlled by the channel switching circuits 200. These switching circuits are essentially identical, and each WC is connected to a respective one of the modules. The operation of switching module 204 enclosed within dotted box in FIG. 5 will be described.

Module 204 includes three 16-to-1 multiplexers 206, 208, and 210 and a 1-of-16 decoder which switch the VCL, VD, RSP, and CMD signals between individual WC's and a selected MSD. A latch 212 stores 5 bits. Four bits are applied to the address inputs to multiplexers 206-210 and decoder 211 to select the desired channel. A fifth line is applied to enable inputs to multiplexers 206-210 and decoder 211 to enable and disable them as the associated WC is connected to and disconnected from a channel. Data is clocked into latch 212 by a signal from decoder 232 on line 242. Data is clocked into a corresponding latch in the other channel switching circuits 246, 248, and 250 by three other signals 244 from decoder 232.

The inputs to multiplexers 206-210 are respectively the video data (VD) signals, the video clock (VCL) signals, and the response (RSP) signals from all 16 MSD's connected to a module. Thus multiplexer 206 has the video data signals VD0 through VD15 from the sixteen MSD's applied to its input. Similarly, the clock signals VCL0-VCL15 are applied to multiplexer 208 and response signals RSP0-15 are applied to multiplexer 210. If the optional diagnostic device 154 in FIG. 4 is implemented, the VD15, VCL15, and RSP15 signals are replaced by the corresponding DIAG/VD15, DIAG/VCL15, and DIAG/RSP15 signals from multiplexer 158, as shown in FIG. 5.

The VD and VCL signals are applied directly to the WC via buffer/driver circuits 216. In the described embodiment, the signals from drivers 216 are differential, RS422 compatible signals, although other protocols can be used. The RSP signal from multiplexer 210 is applied to the WC via AND gate 220. The second input to AND gate 220 comes from the TXD1 output of UART 260 via a 2-to-1 multiplexer 222 and is the path by which processor 100 communicates with each WC. The processor controls the timing of the signals applied to AND gate 220 so that only one signal at a time is sent to the WC.

The CMD signal from the WC is applied via receiver circuitry 218 to the input of decoder 211. When decoder 212 is enabled by a signal on line 214, the data from the WC switches the state of the proper output line from the decoder to send commands to the MSD designated by the data in latch 212. The outputs from the decoders 211 in each switching circuit 200 going to each MSD are applied through open collector buffers, not shown, and are connected together so that the enabled decoder will control the CMD signal to the MSD. The CMD data from the WC is also sent to the switch controller 50 via multiplexer 224 as described below. When a command requesting connection to a particular MSD channel is sent by a WC, decoder 212 should normally be disabled by the signal on line 214 so that this command is not sent to any of the MSD's.

If the system is configured to write data to an MSD, an additional decoder 274 may be included to transmit the data to be written (WD) to the currently selected MSD channel. This decoder operates similarly to decoder 211.

A signal on line 252 provides a clock signal for a latch 254. One bit of data from the data bus is clocked into latch 254 which provides a LOOP signal to each switching circuit 200. The LOOP signal enables and disables a "loopback" mode used to test UART operation.

If the LOOP signal from latch 254 goes low, the lines from the TXD outputs of each of the UART's on an I/F module are connected to the RXD input on that UART and the associated WC and channel are disconnected from the UART by multiplexers 224 and 222. This "loopback" mode allows the processor 100 to do diagnostic checking of the UART's.

During normal operation, the LOOP signal is low, and the outputs of multiplexers 222 and 224 are connected to the A inputs so that CMD signals from WC∅ are applied to the RXD1 input of the first half of dual UART 260. Thus each time that WC∅ sends a command on its CMD line, it is applied to UART 260. In response, the UART pulls its INT output low. The INT outputs of UART's 260 and 262 are open collector outputs which are tied together and connected to +V via a resistor 274. The signals from the INT outputs of the UARTs are applied via a buffer 272 to the INT interrupt input to processor 100. Buffer 272 is an open collector buffer which is connected to the INT outputs from all the I/F modules that may be connected into the system. Thus, an INT signal from any UART will pull the INT outputs from buffers 272 low, interrupting the processor. The processor may then determine which board generated the interrupt by reading the outputs from buffers 270 for each I/F module until it finds the module that generated the interrupt. The status registers for the UART's in that module are then read to determine which UART has received data, and then the data is read.

The TXD1 output of the first half of dual UART 260 is applied to AND gate 220 via multiplexer 222. Processor 100 may send a signal to WC∅ by loading the data to be sent into the corresponding UART. The data is then sent out by the UART from its TXD1 output via multiplexer 222 and and gate 220 to WC∅. The processor is programmed so that it cannot try to send data at the same time that an MSD might be sending an RSP signal to the WC via multiplexer 210.

FIGS. 6-10 are flow diagrams showing the procedures carried out by the invention to connect individual ports to selected channels. Further details of these procedures may be found by examining the exemplary assembly source code listing of a program for implementing these procedures on the embodiment of the present invention described herein using an Intel 8051 microprocessor, attached hereto as Appendix A.

Before describing the procedures of FIGS. 6-10, the command syntax of the image transfer controller will be explained. It should be appreciated that these commands are arbitrary and that another command set could equally well be used.

A port requests to be attached to a particular channel by sending the command "mn A" where m and n are ASCII representations of the 2 digits identifying the desired channel. The term "attached" will be used to designate the connection of a port to a channel by the operation of image transfer controller 40. In response to a request to attach a port, the image transfer controller first sends either a "K," acknowledging the command and indicating that the command syntax is correct, or an "X," indicating that the syntax was incorrect.

Following a "K" response the image transfer controller checks the status of the requested channel and returns a "D," "B," "U," or "S." A "D" indicates that the command was completed and the port is attached to the requested channel. A "B" indicates that the requested channel is busy (i.e., currently being used by another port) and that the port was not connected. A "U" indicates that the requested channel is currently not connected to an MSD device. An "S" represents that the MSD connected to that channel is currently unavailable. This could be because it is off-line for checking or because it has reported an error condition that prevents further use, for example. The "S" may be replaced with responses which more specifically represent the type of condition preventing use of the MSD, if desired.

To disconnect from a channel, a WC connected to a port sends a "D". The response from the image transfer controller to such a request is "KD," indicating successful completion of the command.

The command structure of the MSD's connected to the channels will vary, depending on the particular MSD being used. Once a port is attached to a channel, the image transfer controller will ignore anything sent over the CMD line except for a "D" disconnect request. The following commands for the MSD will be assumed in explaining FIGS. 6–10. A "C" sent to the MSD clears and resets the MSD. Similarly to the image transfer controller, successful completion of a command is acknowledged by a "K" from the MSD. The MSD will typically return other codes indicating the occurence of error conditions.

Figure 6:
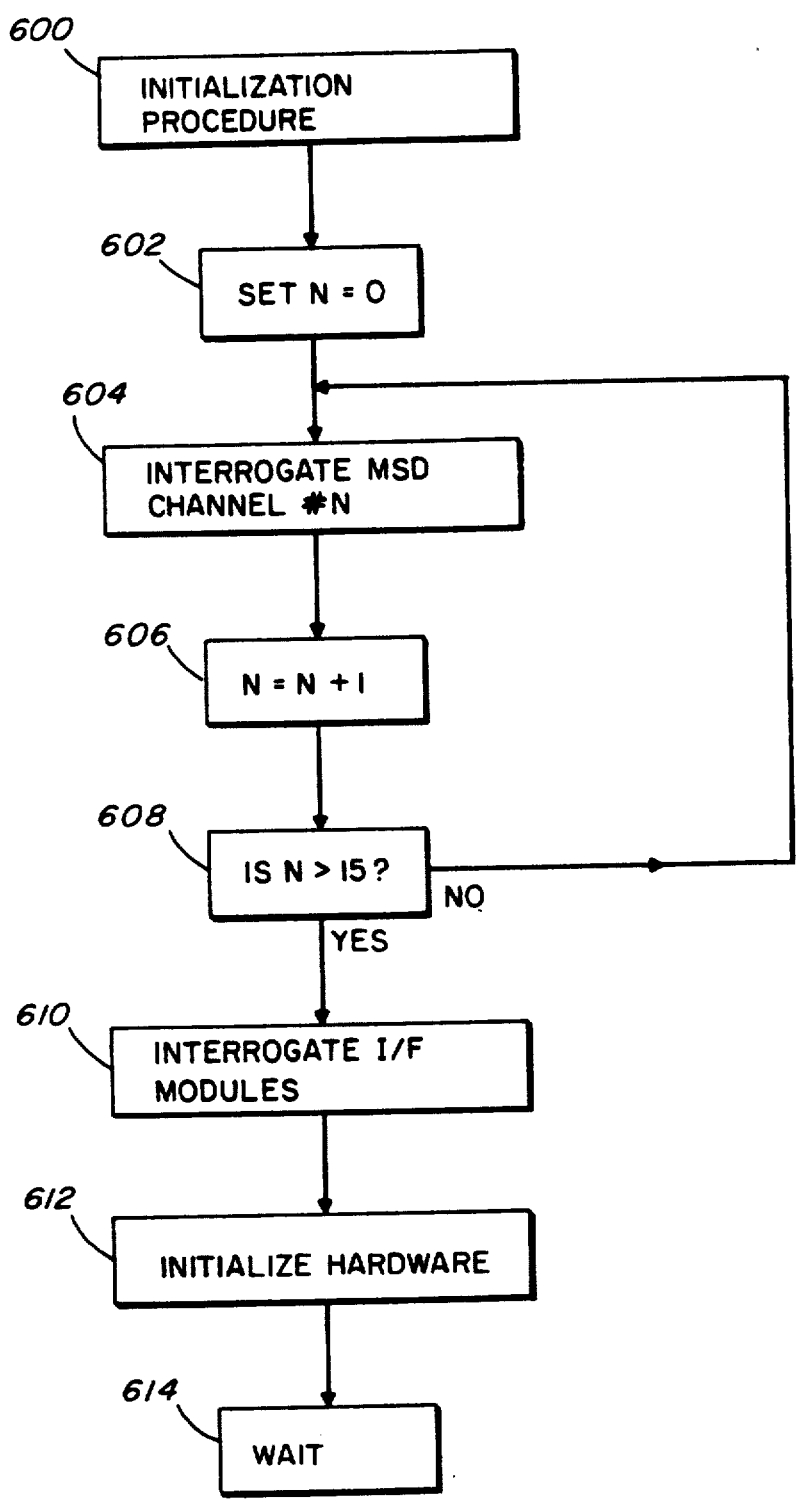
FIGS. 6-8, 9A, 9B and 10 show the procedures carried out by the present invention.

Referring to FIG. 6, processor 100 begins by initializing the system, which includes setting the speed of its internal UART, and setting various registers to the proper initial values, block 600. Following this, the processor sets an index variable N equal to 0, block 602. The processor next interrogates channel N to see whether that channel is connected to a working MSD, block 604. This communication is carried out by the processor using its internal UART and communicating through multiplexer 130 and decoder 132, as described above. The procedures of block 604 are shown in detail in FIG. 7. Next, N is incremented, block 606, and compared with the maximum possible channel number, which is 15 in the described embodiment, block 608.

If all the channels have not been interrogated, the processor returns to block 604 and repeats the above-described procedure for the next channel. Otherwise, the processor interrogates the I/F modules to see which modules are connected to the system, block 610. This procedure is shown in more detail in FIG. 8. Following this, the processor initializes the image transfer controller hardware, including loading the I/F module UART's with the proper values to set baud rate, parity, clear latches 212, and other similar tasks.

The processor then goes to a wait state, block 614, where it waits to be interrupted by either a time-out timer interrupt or an interrupt from an I/F module UART. The response of the processor to these interrupts is shown in FIGS. 9 and 10. Typically, other procedures, unimportant to the description of the present invention, are also carried out by the processor during the time that it is in the wait state. It should be appreciated that instead of being interrupt driven, the processor alternately could constantly poll the timeout timers or the I/F module UART's to determine when it needs to take further action, and the listing in Appendix A illustrates such an alternative procedure.

Figure 7:
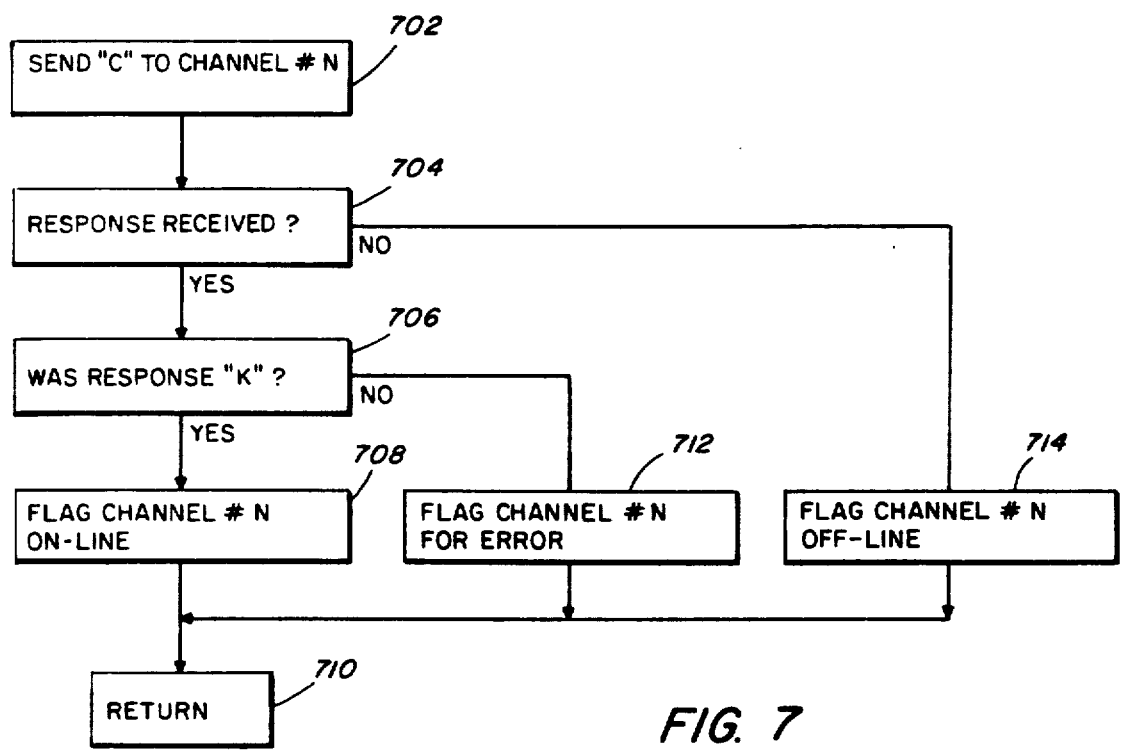

FIG. 7 shows the steps carried out to interrogate the individual channels. When this procedure is called, processor 100 sends a "C" clear command to channel N, block 702, N being determined by the calling procedure. It then waits a predetermined time for a response from that channel, block 704. This communication is carried out by the processor using its internal UART and communicating through multiplexor 130 and decoder 132, as described above.

If no response is received from the channel within the allotted time, the processor sets a flag for that channel indicating that it is not connected to an MSD, block 714, and returns to the calling procedure, block 710. If a response is received, the processor proceeds to block 706 where it checks to see if the response was a "K," indicating that the clear command was successfully carried out. If so, the processor flags that channel as being on-line, block 708, and returns, block 710. If the clear command could not be carried out, the MSD returns an error code. The processor then flags the channel as being not functional, block 712, and returns, block 710. The processor may optionally store information indicating the type of malfunction, which information can be retrieved by a WC connected to a port on the image transfer controller by sending a command requesting this information, if desired.

Figure 8:
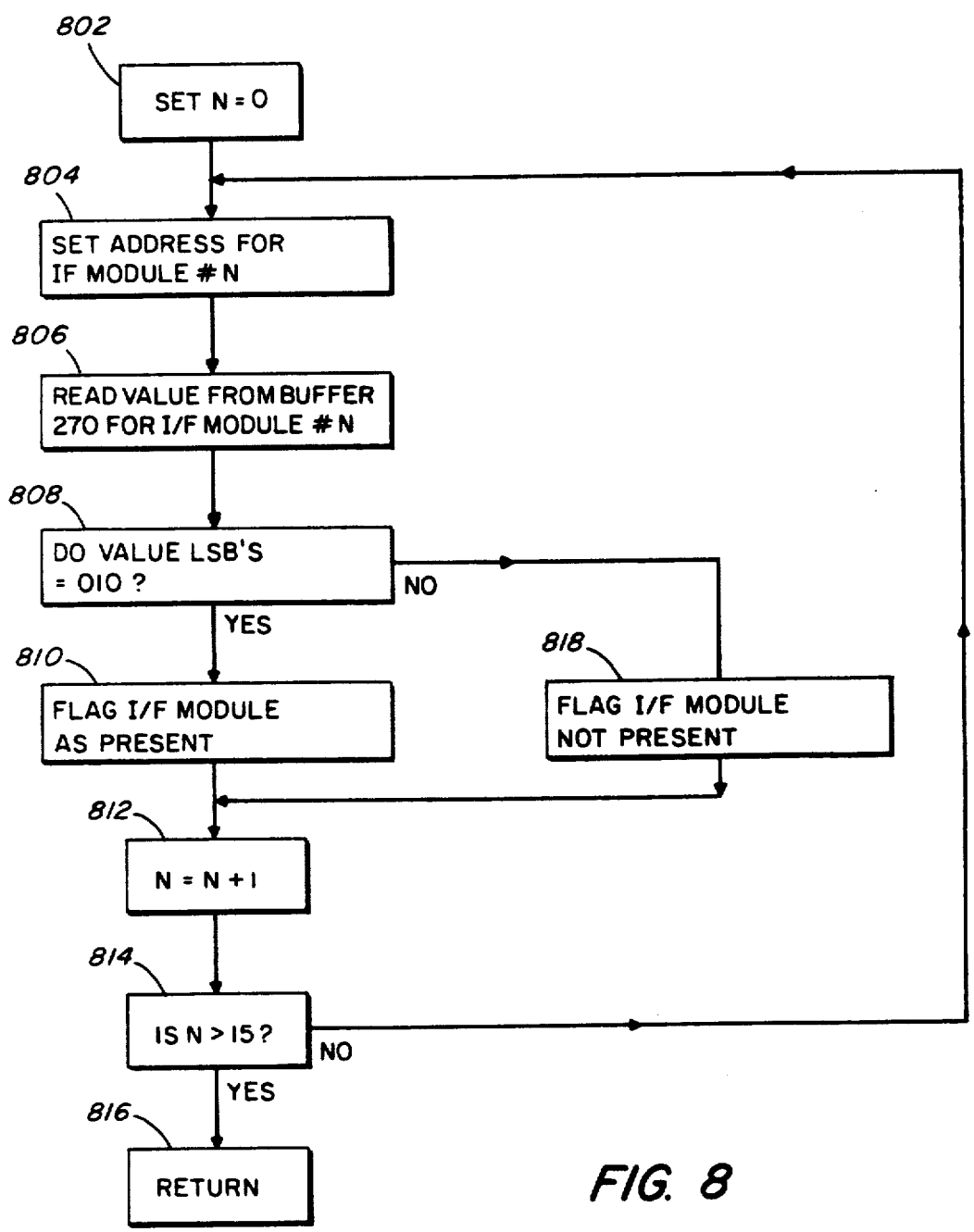

FIG. 8 shows the procedure carried out in interrogating the I/F modules. The processor first sets an index variable N to zero, block 802. Next, the proper address to read buffer 270 for I/F module N is determined and applied to the address bus, block 804. The data on the data bus is then read, block 806. The processor tests to see whether the three LSB's are 010, block 808. If so, the processor sets a flag indicating that that I/F module and the associated four ports are connected, block 810; otherwise, the processor flags that I/F module as not present, block 818.

The processor next increments N, block 812. If N is greater than the maximum I/F modules number (15 in the described embodiment), the procedure returns, block 816. Otherwise, the above procedure is repeated for the next I/F module.

Figure 9A:
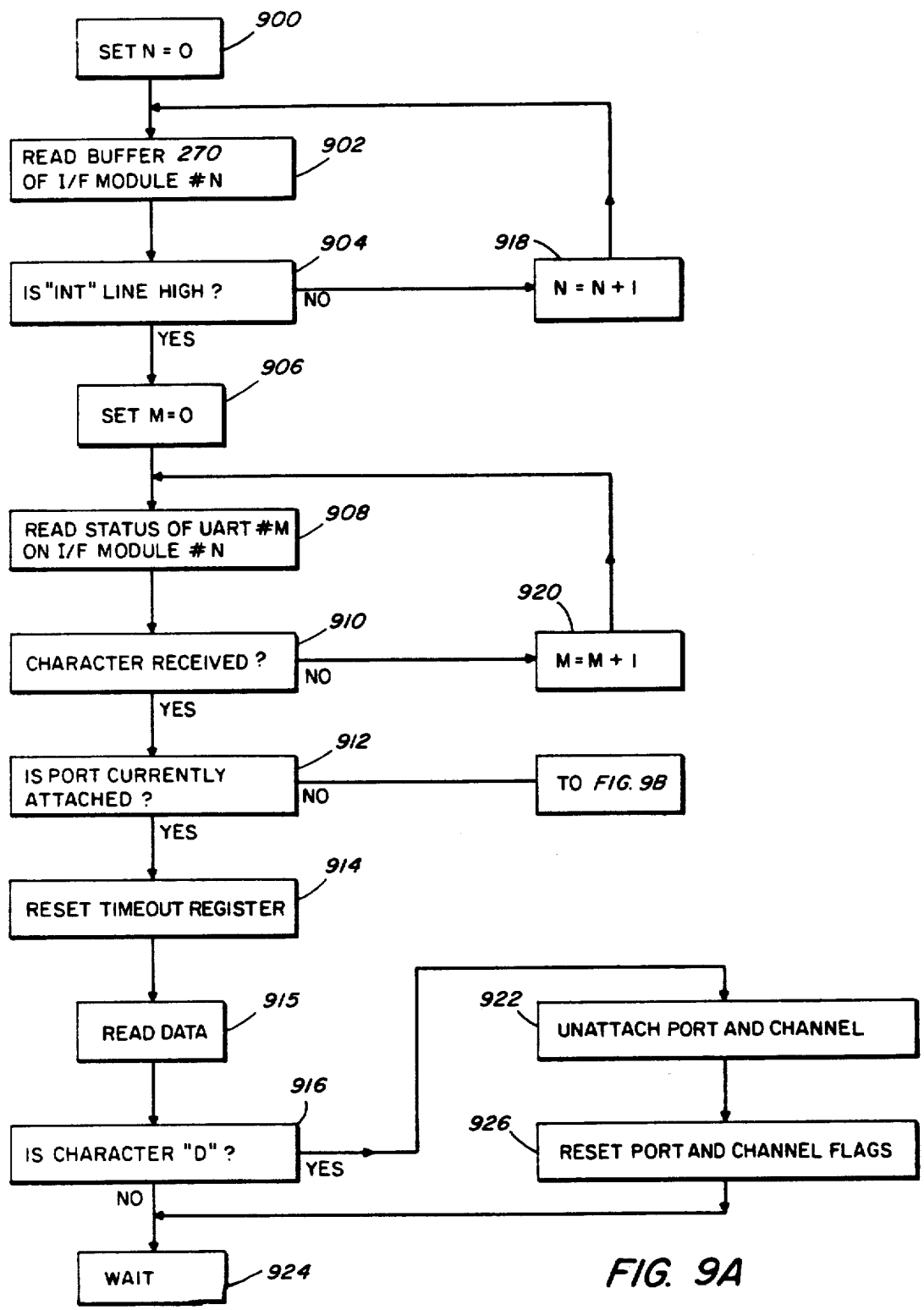
Figure 9B:
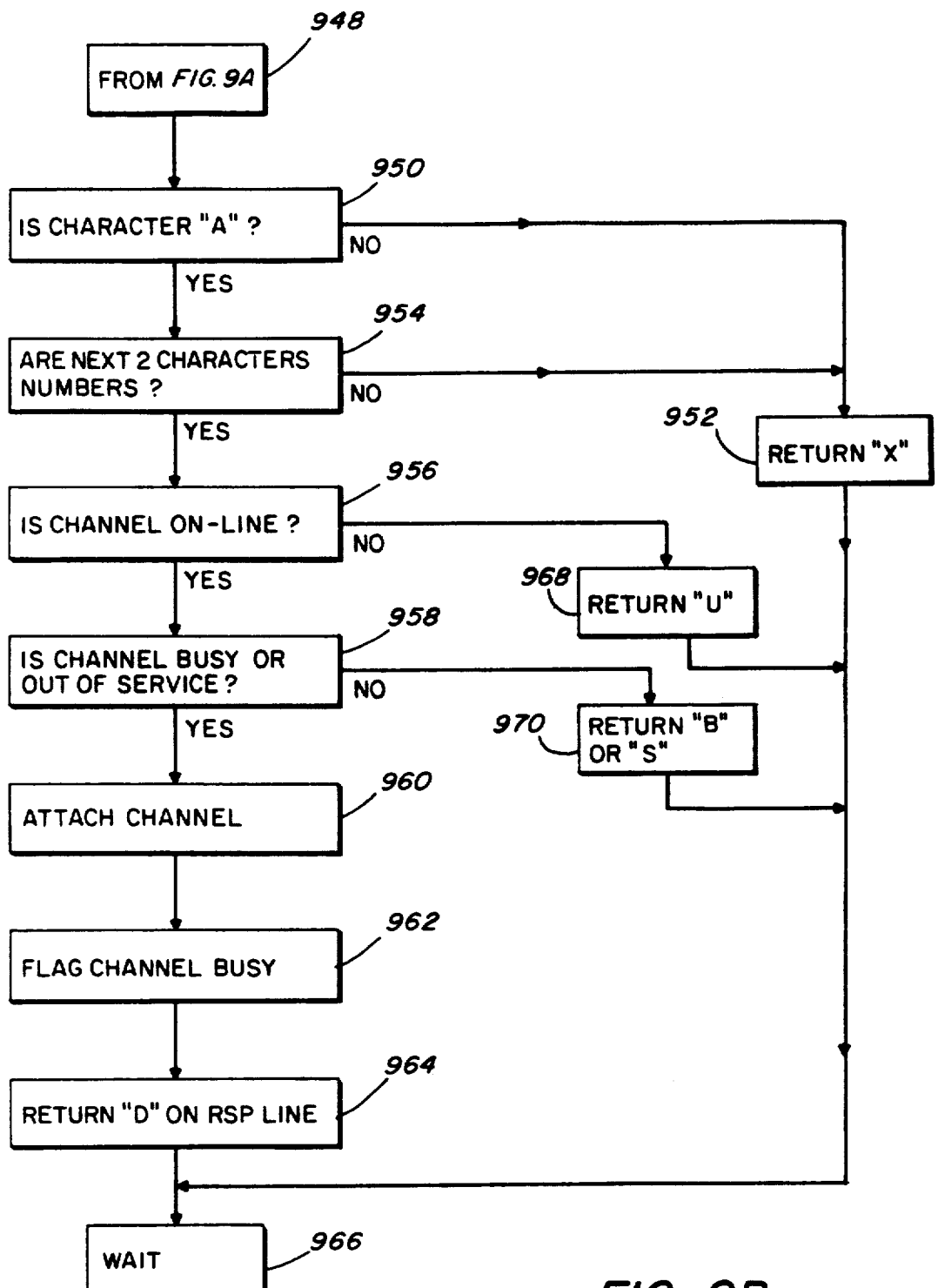
Figure 10:
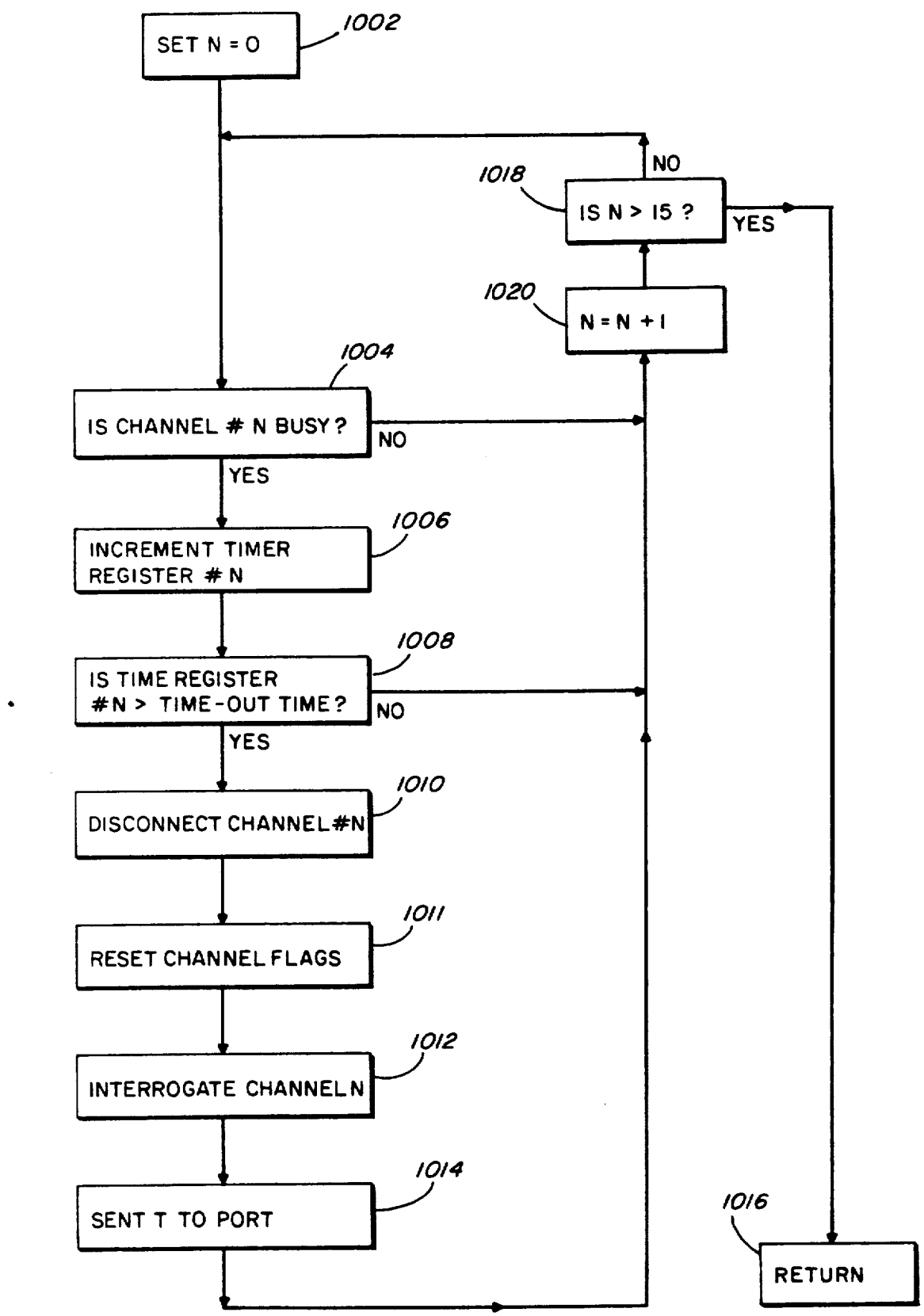

FIGS. 9A and 9B show the procedure carried out when one of the UART's 260 or 262 on an I/F module interrups the processor, indicating that a character has been received. The processor is interrupted by the INT signal from buffers 272 in the I/F modules, all of which are open collector outputs connected in parallel to the processor interrupt request input. Thus, the processor does not have any information about which UART caused the interrupt when it begins the procedure in FIG. 9.

First, an index variable N is set to 0, block 900. Next the processor reads the data applied to buffer 270 of I/F module N, block 902. If one of the UART's in that module caused the interrupt, the fourth LSB from the UART INT outputs will be high. The processor checks the state of this bit, block 904. If this bit is not high, the processor increments N, block 918, and proceeds to check the next I/F module.

If the bit is high, the processor must determine which of the four UART's (two for each dual UART 260 and 262) generated the interrupt. The processor first sets an index variable M to zero, block 906. Then the status of UART M on I/F module N is checked, block 908. This is done by putting the address corresponding to the status register of UART M on I/F module N on address bus 108. This causes the UART to apply data to its data outputs which indicates the UART status, including whether or not a character has been received. This data is then read from data bus 102 by the processor. If UART M has not received a character, M is incremented, block 920, and the above procedure is repeated to check the next UART.

If a character has been received, the processor checks to see whether that port is currently attached to a channel, block 912. If not, it proceeds to carry out the steps in FIG. 9B. Otherwise, if the port is attached to a channel, the processor first resets the timeout timer, discussed below in connection with FIG. 10, block 914. The processor then reads the data from the UART by putting the address on the address bus corresponding to that UART's data register, block 915. The character is checked to see whether it is a "D" disconnect command, block 916. If the character is not "D," it is assumed to be a command to the MSD connected to the selected channel. The command is ignored, and the processor returns to the wait state, block 924. If the character is a "D," the processor unattaches the channel, block 922. This is done by loading the associated latch 212 so that the enable signal on line 214 is low, disabling the associated decoders and multiplexers. The processor next resets the corresponding channel and port flags to indicate that the channel in no longer busy and that the port is unattached, block 926, and returns to the wait state, block 924.

If a character is received while a port is not connected to a channel, the steps shown in FIG. 9B are carried out. The processor first checks to see whether the character is an "A" command requesting attachement to a channel, block 950. If not, the processor sends back an "X" response on the RSP line, indicating that the command is not in the proper syntax, block 952, and returns to the wait state.

If the character is an "A," the processor verifies that two numerical characters are the next characters received, block 954. If not, the syntax is incorrect, and the processor branches to block 952. Otherwise, the processor checks its channel status flags to see whether that channel is on-line, block 956. If not, a "U" response is returned to the port, indicating that the requested channel is not on-line, block 968, and the processor returns to the wait state. If the channel is on line, the processor checks the channel status flags to see whether it is busy or out of service, block 958. If so, the processor returns a "B" or "S" response on the port RSP line, as appropriate, block 970.

The processor sends signals to a port on the RSP line by loading the data register in the associated UART which is then transmitted by that UART via multiplexer 222 and AND gate 220 to the port. These responses are sent only when the port is not attached to a channel and thus these signals will not interfere with signals sent to the port from an MSD connected to the channel.

If the channels is on-line and available, the processor attaches the channel to the port, block 960. This is done by loading the latch 212 for that port with five bits identifying the channel and enabling the associated multiplexers and decoder, as described above in connection with FIG. 5. Once this is done, all communication between the computer or workstation attached to the port and the MSD connected to the selected channel takes place directly, without active intervention by the image transfer controller 40. The CMD line is monitored by the processor to detect a disconnect request from the port and to allow the channel to be disconnected if no activity takes place for a predetermined time, as described below.

The processor next sets the channel flags to indicate that that channel is in use, block 962, and returns a "D" to the port to verify that the connection has been successfuly made, block 964. The processor then returns to the wait state.

FIG. 10 shows the steps carried out by the processor to provide a time-out function for the channels. If no activity to an attached channel occurs for a predetermined amount of time, the channel is disconnected from the attached port. This might be caused, for example, by a WC connected to a port which is attached to a channel being turned off without sending a "D" disconnect command.

Processor 100 in the described embodiment includes an internal timer which interrupts the processor at regular intervals. This interrupt is used to provide the time-out function. When this interrupt occurs, the steps of FIG. 10 are carried out.

First, the processor sets an index variable N to zero, block 1002. Next the processor checks the channel status flags to determine whether channel N is busy, block 1004. If not, N is incremented, block 1020, and then checked to see whether N is greater than the highest channels number (15 in the described embodiment), block 1018. If not, the next channel is checked to see if it is busy. If all channels have been checked, the processor returns to the wait state, block 1016.

If a channel is busy, the processor increments the value in a corresponding channel time-out register, block 1006. Each time that the processor detects activity on a CMD line currently attached to a channel, the associated channel time-out register is reset, block 914, as described above. Thus, the value in this register represents the time since the last activity on the CMD line to that channel.

Next, the processor checks the value in the time-out register for channel N to see whether the maximum inactive time has been exceeded, block 1008. If not, the next channel is checked, as described above. If the maximum inactive time has been exceeded, the processor disconnects the channel, block 1010, and sets the channel and port flags to indicate that they are no longer attached, block 1011. Following this, the processor may optionally interrogate the channel, block 1012, to check for errors or malfunctioning of the channel, block 1012. This procedure is shown in FIG. 7 described above. The processor may then send a "T" to the disconnected port to indicate that a time-out error caused disconnection, block 1014. The processor then checks the next channel as described above. In the described embodiment, the time-out interval is approximately thirty seconds.

As described above in connection with FIG. 3, the maximum configuration of the described embodiment includes 16 I/F modules and will provide connections between 64 WC's and 16 MSD's. The present invention has the capability of being cascaded to provide interconnections between larger numbers of devices.

Referring to FIG. 11A, two image transfer controllers 1102 and 1104 are shown which each have the maximum configuration of 64 ports by 16 channels. One of the controllers 1104 has its sixteen channels connected to sixteen of the ports on the second controller 1102, as indicated by connection 1106. The devices connected to the 16 channels from controller 1102 can now be attached to any of the 48 remaining ports of controller 1102 and also to the 64 ports of controller 1104. Thus, by cascading two controllers as shown in FIG. 11A, the maximum number of ports may be expanded to create a 112 port by 16 channel system.

FIG. 11B shows a system in which two controllers 1112 and 1114 are cascaded to increase the maximum number of channels. In FIG. 11B, four channels from a 64 port by 16 channel controller 1112 are connected via line 1116 to the four ports of a 4 port by 16 channel controller 1114. The result of this connection is a 64 port by 28 channel system. Is should be apparent that additional ports 1118 may be added to controller 1114 in FIG. 11B, by adding additional I/F modules 60. In this case, the additional ports 1118 would only be able to access devices attached to the 16 channels of controller 1114 while the ports attached to controller 1112 would be able to access all 28 channels. Such a configuration may be useful in situations where some users need access to only selected data storage devices while others require access to all devices.

The connection of FIG. 11B has only four lines between controller 1112 and controller 1114. Thus the system of FIG. 11B will only support four simultaneous connections between the devices attached to the 64 ports of controller 1112 and the 16 channels of controller 1114. This limitation may or may not degrade the system performance appreciably, depending on the frequency with which the devices connected to the ports of controller 1112 access the 16 channels of controller 1114. FIG. 11C shows a system in which two 8 port by 16 channel controllers are interconnected to provide an 8 port by 24 channel system. In FIG. 11C, four channels from each of controllers 1122 and 1124 are connected to four ports on the other controller via lines 1126 and 1128. This system allows all the ports connected to each controller to simultaneously access channels of the other controller. Of course, a port will still not have access to a channel currently in use by another port.

The configurations shown in FIG. 11 may be implemented without any changes in the procedures described above in FIGS. 6–10. The WC's connected to the ports must be programmed or otherwise instructed to give the proper signals on the CMD line, and thus must have knowledge of the system configuration. To create a connection between port 1108 and channel 1109 in FIG. 11A, for example, the device attached to port 1108 would first issue a "A00" command requesting to be attached to the first channel. When controller 1104 indicates that a connection has been made, the WC next issues an "A15" command requesting attachment to channel 1109. This command is passed through by controller 1104, since the controller ignores all commands except for detach requests once a port is connected to a channel. If controller 1104 indicates that the first channel is busy, the WC program or operator should then check the remaining cascaded channels to see whether there is a free channel.

The procedures described above in connection with FIGS. 6–10 may be modified to allow the controllers 40 to be more transparent to the WC's using a cascaded connection. Switches 152 in FIG. 4 may be used to indicate to processor 100 the number of channels of a particular controller that is being used in cascade mode. For example, a value of zero on switches 152 would indicate that all output channels are directly connected to MSD's while a value, of sixteen would indicate that all sixteen channels are being used in cascade mode, as illustrated by FIG. 11A. During the initialization procedures 600, processor 100 reads the value on switches 152 by enabling buffer 150 and reading the value on data bus 102. If a value of four is on switches 152, for example, the processor knows that the lowest four channels are used in cascade mode. This information is stored in the channel status flags. The processor will then recognize that any request for one of these channels may be implemented using any of these channels. A request for a cascaded channel will cause the controller to search for a free channel and to attach the requesting port to any of the cascaded channels, if one is available for use. This obviates the need for the individual WC's to be programmed to retry remaining channels if a first channel is busy for the configuration such as shown in FIG. 11. If switches 152 indicate that all sixteen channels are cascaded, the controller can be programmed to respond to all requests for attachment by locating an available channel, if one exists, and automatically passing through the attachment request to the following controller 40. With a system which carries out these steps, a cascaded system such as that shown in FIG. 11A would be completely transparent to the devices connected to the ports and would use the same command structure as a non-cascaded system. Thus, additional ports in excess of 64 can be added to a system without any modification to the programming of devices attached to the ports.

The configurations shown in FIG. 11 are given as examples only, and it will be readily apparent to one of ordinary skill in the art that FIG. 11 shows only a few of the many possible cascaded interconnections between controllers 40 which can be implemented to provide configurations of different capacities. It should also be apparent that more than two controllers 40 can be cascaded to implement larger or more complicated systems. There has been described a new and useful controller for selectively interconnecting different devices to provide rapid transfer of data between the devices. In using the present invention in different applications, the teachings herein may be used by those of ordinary skill in the art to create systems which differ from the embodiments described herein. Accordingly, the scope of the present invention should not be limited to the particular configurations shown herein, but rather should be interpreted in accordance with the following claims.

APPENDIX A

```
;----------------------------------------------------------------
;THIS PROGRAM WILL BE USED TO DRIVE THE MODULAR MUX HARDWARE.
;THE PROGRAM WILL BE WRITTEN MODULARLY, SO AS TO ALLOW FOR
;ADDITION OF PIC AND TERA DEVICES.
;THE SOFTWARE WILL SUPPORT A PIC MUX WITH UP TO 8 I/O SLOTS, AT
;LEAST ONE SLOT SHOULD BE UTILIZED FOR A TERA LINE INTERFACE CARD,
;AND THE REST FOR 4 PORT BOARDS. CONFIGURATIONS MAY CONSIST OF A
;4x1(PICxTERA) UP TO A 24x8, OR 28x4.
;----------------------------------------------------------------

CSEG                            ;CODE SEGMENT

;               ----------------EQUATE TABLES----------------

PORT0   EQU  00H                        ;PORT P0 CONTROL
PORT1   EQU  01H                        ;PORT P1 CONTROL
PORT2   EQU  02H                        ;PORT P2 CONTROL
PORT3   EQU  03H                        ;PORT P3 CONTROL
IFCON   EQU  04H                        ;INTERFACE BOARD CONTROL REGISTER(DUART
                                        ;RESET & LOOP BACK)
UARTSEL EQU  00H                        ;CONTROLLER PORT UART CHANNEL SELECT
TIM07   EQU  00H                        ;CONTROLLER TIMEOUT REGISTER FOR CHANNELS
                                        ;0-7.
TIM815  EQU  01H                        ;TIMEOUT FOR CHANNEL 8 THRU 15.
ID      EQU  00H                        ;ID OPTION CODE ADDRESS.

;               ----------------2681 REGISTER ASSIGNMENTS----------------
                                        ;URT0 ASSIGNMENTS. (THIS UART IS
                                        ; DEDICATED TO PORT P0).
URT0MR     EQU  05H                     ;URT0 MODE REGISTER 1 & 2
URT0CSR    EQU  15H                     ;URT0 CLOCK SELECT REGISTER.
URT0CR     EQU  25H                     ;URT0 COMMAND REGISTER
URT0THR    EQU  35H                     ;URT0 TRANSMIT HOLDING REGISTER.
URT0ACR    EQU  45H                     ;URT0 AUXILIARY COMMAND REGISTER.
URT0%1IMR  EQU  55H                     ;URT0 AND URT1 INTERRUPT MASK REGISTER
URT0CTUR   EQU  65H                     ;URT0 COUNTER/TIMER UPPER REGISTER
URT0CTLR   EQU  '5H                     ;URT0 COUNTER/TIMER LOWER REGISTER
URT0SR     EQU  15H                     ;URT0 STATUS REGISTER
URT0RHR    EQU  35H                     ;URT0 RECEIVE HOLDING REGISTER
URT0%1ISR  EQU  55H                     ;URT0 & URT1 INTERRUPT STATUS REGISTER
URT0CTUS   EQU  65H                     ;URT0 COUNTER TIMER UPPER STATUS
URT0CTUS   EQU  75H                     ;URT0 COUNTER TIMER LOWER STATUS

;UART 1 IS DEDICATED TO PORT P1.
URT1MR     EQU  85H                     ;URT1 MODE REGISTER 1 & 2
URT1CSR    EQU  95H                     ;URT1 CLOCK SELECT REGISTER.
URT1CR     EQU  0A5H                    ;URT1 COMMAND REGISTER
URT1THR    EQU  0B5H                    ;URT1 TRANSMIT HOLDING REGISTER
URT1ACR    EQU  45H                     ;URT1 AUXILIARY COMMAND REGISTER.
URT1CTUR   EQU  65H                     ;URT1 COUNTER/TIMER UPPER REGISTER
URT1CTLR   EQU  75H                     ;URT1 COUNTER/TIMER LOWER REGISTER
```

```
URT1SR     EQU   95H          ;URT1 STATUS REGISTER
URT1RHR    EQU   0B5H         ;URT1 RECEIVE HOLDING REGISTER
URT1CTUS   EQU   65H          ;URT0 COUNTER TIMER UPPER STATUS
URT1CTLS   EQU   75H          ;URT0 COUNTER TIMER LOWER STATUS

STRCNTO%1  EQU   0E5H         ;TIMER1 START COUNTER (ON BOARD TIMER).
STPCNTO%1  EQU   0F5H         ;TIMER1 STOP COUNTER COMMAND

;URT2 ASSIGNMENTS. (THIS UART IS
                              ;DEDICATED TO PORT P2).
URT2MR     EQU   06H          ;URT2 MODE REGISTER 1 & 2
URT2CSR    EQU   16H          ;URT2 CLOCK SELECT REGISTER.
URT2CR     EQU   26H          ;URT2 COMMAND REGISTER
URT2THR    EQU   36H          ;URT2 TRANSMIT HOLDING REGISTER
URT2ACR    EQU   46H          ;URT2 AUXILIARY COMMAND REGISTER.
URT2%3IMR  EQU   56H          ;URT2 AND URT3 INTERRUPT MASK REGISTER
URT2CTUR   EQU   66H          ;URT2 COUNTER/TIMER UPPER REGISTER
URT2CTLR   EQU   76H          ;URT2 COUNTER/TIMER LOWER REGISTER
URT2SR     EQU   16H          ;URT2 STATUS REGISTER
URT2RHR    EQU   36H          ;URT2 RECEIVE HOLDING REGISTER
URT2%1ISR  EQU   56H          ;URT2 & URT3 INTERRUPT STATUS REGISTER
URT2CTUS   EQU   66H          ;URT2 COUNTER TIMER UPPER STATUS
URT2CTLS   EQU   76H          ;URT2 COUNTER TIMER LOWER STATUS

;URT3 DEDICATED TO PORT P3.
URT3MR     EQU   86H          ;URT3 MODE REGISTER 1 & 2
URT3CSR    EQU   96H          ;URT3 CLOCK SELECT REGISTER.
URT3CR     EQU   0A6H         ;URT3 COMMAND REGISTER
URT3THR    EQU   0B6H         ;URT3 TRANSMIT HOLDING REGISTER
URT3ACR    EQU   46H          ;URT3 AUXILIARY COMMAND REGISTER.
URT3CTUR   EQU   66H          ;URT3 COUNTER/TIMER UPPER REGISTER
URT3CTLR   EQU   76H          ;URT3 COUNTER/TIMER LOWER REGISTER
URT3SR     EQU   96H          ;URT3 STATUS REGISTER
URT3RHR    EQU   0B6H         ;URT3 RECEIVE HOLDING REGISTER
URT3CTUS   EQU   66H          ;URT3 COUNTER TIMER UPPER STATUS
URT3CTLS   EQU   76H          ;URT3 COUNTER TIMER LOWER STATUS

STRCNT2%3  EQU   0E6H         ;TIMER1 START COUNTER COMMAND (ON BOARD
                              ;TIMER).
STPCNT2%3  EQU   0F6H         ;TIMER1 STOP COUNTER COMMAND

DSEG                          ;THE FOLLOWING DATA WILL BE LOCATED IN
                              ;INTERNAL RAM.

;                 ----------------TERA ON-LINE TABLE----------------

ORG        20H       ;ADVANCE LOCATION COUNTER 32 ADDRESS
                                ;SPACES TO PREVENT OVERWRITING OF
                                ;REGISTER BANKS.

;TERA DEVICES ON-LINE TABLE, 00H=ON-LINE, OFFH=OFF-LINE.
```

```
TERAO:          DS      08H

;               ----------------I/F ON-LINE TABLE----------------
;I/F BOARDS FLAGGED AS ON-LINE WILL BE CONSTANTLY POLLED BY THE
;MUX FIRMWARE FOR ATTACH COMMANDS.

IFO:            DS      00CH         ;0FFH=NOT PRESENT, 00H=IN PLACE.

;               ----------------CHANNEL REGISTER TABLE----------------
;THIS TABLE IS USED BY MUX FIRMWARE TO KEEP TRACK OF CHANNEL
;ALLOCATION.

CHANO:          DS      00AH         ;0FFH=OPEN OR SLOT# &PORT THAT
                                     ;CHANNEL IS ATTACHED TO.

;               ----------------PIC ATTACH ADDRESS TABLE----------------

PICO:           DS      20H          ;THIS BYTE CONTAINS ADDRESS
                                     ;THAT MUX WILL ATTACH PICO
                                     ;TO,WHEN A ATTACH COMMAND IS
                                     ;GIVEN.
VAR1:           DS      01H
VAR2:           DS      01H
VAR3:           DS      01H
VAR4:           DS      01H
VAR5:           DS      01H
VAR6:           DS      01H

;----------------------------------------------------------------
;               ----------------MAIN PROGRAM----------------
CSEG                    ;CODE SEGMENT START

ORG     00H          ;BEGINNING OF CODE

AGAIN:          MOV     SP,#07H      ;SET UP STACK POINTER.
                CALL    INTIF        ;CHECK FOR I/F BOARDS AND
                                     ;INITIALIZE.
                                     ;BUILD ON-LINE TABLE
                CALL    INTERA       ;CHECK FOR TERA DEVICES.
                                     ;BUILD ON-LINE TABLE.
                CALL    INIT         ;RESET HARDWARE.

JMP     AGAIN        ;CONTINUOSLY LOOP.

;----------------------------------------------------------------
;----------------------------------------------------------------

INTIF:          MOV     VAR1,#00H    ;THIS POLLS I/F BOARDS AND
                                     ;UPDATES I/F BOARD ON-LINE
```

```
                                        ;TABLE.

NEXTIF:     MOV     A,VAR1
            ADD     A,#01H
            MOV     VAR1,A

CONT1:      MOV     A,#009H
            CJNE    A,VAR1,FINDIF
            RET

FINDIF:     MOV     A,#70H
            ORL     A,VAR1
            MOV     DPH,A               ;UPPER ADDRESS OF I/F
                                        ;BOARD TO BE READ.
            MOV     DPL,#00H            ;LOWER ADDRESS
            MOVX    A,@DPTR             ;READ ID CODE OF I/F BOARD
            ANL     A,#07H
            CJNE    A,#02H,IFNOTFOUND
                                        ;SAVE ID OF I/F BOARD
                                        ;FOUND.
            MOV     R0,#IF0             ;MOVE INTO R0, POINTER TO
                                        ;I/F TABLE.
            MOV     A,VAR1
            ADD     A,R0                ;GET OFFSET OF ENTRY IN
                                        ;TABLE
            MOV     R0,A
            MOV     @R0,#00H            ;FLAG I/F BOARD IN PLACE.
            JMP     NEXTIF

IFNOTFOUND: MOV     R0,#IF0             ;MOVE POINTER TO TABLE
                                        ;INTO R0
            MOV     A,VAR1
            ADD     A,R0
            MOV     R0,A
            MOV     @R0,#0FFH           ;FLAG BOARD AS NOT IN
                                        ;PLACE.
            JMP     NEXTIF

;----------------------------------------------------------------
INTERA:     MOV     VAR1,#00H           ;VARIABLE USED TO KEEP
                                        ;COUNT OF TERA DEVICE
                                        ;BEING POLLED.

;INITIALIZE TIMER, AND
                                        ;SERIAL CHANNEL.
            MOV     TL1,#00H
            MOV     TH1,#0F3H           ;LOAD TH1 WITH 239 DECIMAL
                                        ;COUNT(EFH) WITH N=16 AND
                                        ;OSCILLATOR FREQ. OF 8MH2,
                                        ;SHOULD RESULT IN 2450 BPS
                                        ;SERIAL CHANNEL BAUD RATE.
            MOV     87H,#00H            ;SETS SMOD=0(N=32).
```

```
              MOV      IE,#00H           ;DISABLE ALL INTERRUPTS.
              MOV      TMOD,#02FH        ;SETS TIMER 1 IN MODE 2.
                                         ;AUTO RELOAD.
                                         ;TIMER WILL CLOCK THE
                                         ;SERIAL CHANNEL.

MOV      TCON,#4FH         ;START TIMER1.

;SET UP SERIAL CHANNEL.
                                         ;MODE1, 8DATA BITS(ONE
                                         ;USED FOR PARITY) ONE
                                         ;START, ONE STOP BIT.
              MOV      SCON,#50H         ;ENABLE MODE1, ENABLE
                                         ;RECEIVER, CLEAR RI AND TI
                                         ;FLAGS.
                                         ;SERIAL CHANNEL READY AT
                                         ;THIS POINT!!!!!

PROC:         MOV      A,#08             ;INTERROGATE THE FIRST 8
                                         ;CHANNELS.
              CJNE     A,VAR1,NXTERA     ;WHEN DONE THEN RETURN
              MOV      A,#10H
              MOV      DPL,#00H          ;READY TO DISABLE UART
                                         ;CHANNEL.
              MOV      DPH,#00H
              MOVX     @DPTR,A
              RET

NXTERA:       MOV      DPH,#00H
              MOV      DPL,#00H          ;PREPARE TO SELECT
                                         ;CHANNEL.
              MOV      A,VAR1            ;
              MOVX     @DPTR,A           ;SELECT CHANNEL (VAR1).
              CALL     TIME              ;DELAY BEFORE CLEARING
                                         ;RECEIVER.
              MOV      SCON,#50H         ;CLEAR RI AND TI.
              MOV      SBUF,#43H         ;SEND CLEAR COMMAND TO
                                         ;CAROUSEL(ODD PARITY)
              CALL     TIME              ;HALF SECOND DELAY

;LOAD TABLE POINTER INTO
                                         ;R0.
              MOV      R0,#TERAO         ;MOV ADDRESS OF TERAO
                                         ;TABLE INTO R0

MOV      A,VAR1            ;TERA NOT FOUND, MARK AS
                                         ;OFF-LINE.
              ADD      A,R0
              MOV      R0,A              ;SET TABLE POINTER INTO
                                         ;R0.
                       SCON.0,FNDTERA    ;IF BIT SET, THEN RECEIVED
                                         ;RESPONSE, FOR NOW ASSUME
                                         ;IS GOOD MESSAGE. JUMP TO
                                         ;FOUND TERA.
```

```
                MOV     A,#0FFH
                MOV     @R0,A           ;MARK OFF-LINE, ASSUMES
                                        ;THAT R0 CONTAINS TABLE
                                        ;POINTER ADDRESS.
                JMP     FIN

RET

FNDTERA:        MOV     A,#00H          ;MARK AS ON-LINE.
                MOV     @R0,A           ;MARK AS ON-LINE.
                JMP     FIN

FIN:            MOV     A,VAR1
                INC     ACC
                MOV     VAR1,A
                JMP     PROC            ;PROCEED.

;----------------------------------------------------------------

TIME:           MOV     A,#00H          ;TIMER ROUTINE USED FOR
                                        ;DELAYS.
T:              INC     ACC
                NOP
                CJNE    A,#0FFH,CONT2
                RET

CONT2:          PUSH    ACC
                MOV     A,00H

CONT3:          INC     ACC
                NOP
                CJNE    A,#00FH,CONT3
                POP     ACC
                JMP     T

;----------------------------------------------------------------

$INCLUDE(:F2:ASM1)              ;FILE GWA.MMUX.ASM1 WILL
                                ;BE INSERTED HERE DURING
                                ;ASSEMBLY TIME.

;----------------------------------------------------------------

$INCLUDE(:F2:ASM2)

END

;----------------------------------------------------------------
;THIS PROGRAM CONTAINS THE MAIN PORTION OF THE MUX FIRMWARE. IT
;WILL BE RUN AFTER INTERA AND INTIF.
;----------------------------------------------------------------

ANIT:           MOV     VAR1,#00H       ;VAR1 WILL HOLD INDEX
                                        ;POINTER OF TABLE.
                                        ;LOAD ADDRESS OF CHANNEL
                                        ;REGISTER TABLE.
        MOV     A,VAR1
```

```
NXTREST:   ADD    A,#CHANO
           MOV    R0,A
           MOV    A,#0FFH
           MOV    @R0,A              ;MARK ENTRY AS 'OPEN'.
           INC    VAR1
           MOV    A,VAR1
           CJNE   A,#09H,NXTREST     ;RESET NEXT ENTRY IF NOT
                                     ;DONE.(8 entries)
           JMP    RESADDR            ;IF DONE, CONTINUE TO RESET
                                     ;ADDRESS REGISTER.

RESADDR:   MOV    VAR1,#00H          ;VAR1 WILL INDEX POINTER OF
                                     ;TABLE.
                                     ;LOAD ADDRESS REGISTER TABLE.
           MOV    A,VAR1

RESNXT:    ADD    A,#PIC0
           MOV    R0,A
           MOV    A,#00H
           MOV    @R0,A              ;LOAD DEFAULT ADDRESS OF 00H
           INC    VAR1
           MOV    A,VAR1
           CJNE   A,#19H,RESNXT      ;RESET NEXT ENTRY IF NOT DONE
                                     ;(24 entries)
           JMP    INITHRW            ;IF DONE, CONTINUE TO RESET
                                     ;HARDWARE.

INITHRW:   MOV    VAR1,#00H          ;VAR1 CONTAINS IF BOARD
                                     ;ADDRESS(0-8)
           JMP    CONT4

TONE?:     MOV    A,VAR1
           CJNE   A,#09H,CONT4       ;WHEN RESET ALL 8 BOARDS
                                     ;RETURN.
           RET

CONT4:     MOV    A,VAR1
           ADD    A,#IF0
           MOV    R0,A               ;POINTER TO IFO TABLE.
           CJNE   @R0,#0FFH,RESETIF  ;IF BOARD IN PLACE THEN
                                     ;RESET
                                     ;IF NOT IN PLACE THEN
                                     ;CHECK FOR NEXT BOARD.

NORTIE:    INC                       ;
           JMP    DONE?

RESETIF:   MOV    VAR2,#00H          ;PORT INITIAL ADDRESS.
           MOV    A,VAR1
           ORL    A,#70H
           MOV    DPH,A              ;BOARD EXTERNAL ADDRESS.
           JMP    CONT5

NEXTPORT:  INC    VAR2
           MOV    A,VAR2
           CJNE   A,#04H,CONT5
           JMP    SORTIE             ;WHEN RESET ALL 4 PORTS, GO TO
                                     ;NEXT BOARD
```

```
CONT5:  MOV     A,VAR2
        CJNE    A,#00H,L1
        CALL    RES0            ;PORT 0, RESET.
        JMP     NEXTPORT

L1:     CJNE    A,#01H,L2
        CALL    RES1            ;PORT 1,RESET.
        JMP     NEXTPORT

L2:     CJNE    A,#02H,L3
        CALL    RES2            ;PORT2 RESET.
        JMP     NEXTPORT

L3:     CALL    RES3            ;PORT3 RESET.
        JMP     NEXTPORT

;------------------------------------------------------------
                                ;THIS RESET PORT0 HARDWARE.

RES0:   MOV     DPL,#00H        ;DISABLE PORT
        MOV     A,#10H
        MOVX    @DPTR,A

MOV     DPL,#04H
        MOV     A,#01H          ;RESET DUART
        MOVX    @DPTR,A
        NOP
        NOP
        NOP
        MOV     A,#00H
        MOVX    @DPTR,A         ;ENABLE DUART, DISABLE
                                ;LOOPBACK.
                                ;SET UP UART 1A
                                ;ASSUMES DPH IS LOADED WITH
                                ;UPPER ADDRESS.

MOV     DPL,#URT0MR     ;MODE REG.A ADDRESS
        MOV     A,#0AH          ;EVEN PARITY, FORCE PARITY,7
                                ;DATA BITS
        MOVX    @DPTR,A         ;WRITE TO MODE REGISTER 1A.

MOV     A,#0FH
        MOVX    @DPTR,A         ;WRITE TO MODE REGISTER 2A
        MOV     DPL,#URT0CSR    ;WRITE TO CLOCK SELECT REG.
                                ;A(CSRA)

MOV     A,#0DDH         ;SET FOR TIMER AS CLOCK SOURCE
        MOVX    @DPTR,A

MOV     DPL,#URT0ACR    ;WRITE TO AUXILIARY CONTROL
                                ;REGISTER(ACR)
        MOV     A,#60H
        MOVX    @DPTR,A

MOV     DPL,#URT0%1IMR  ;WRITE TO INTERRUPT MASK
                                ;REG.((IMR)
        MOV     A,#00H
        MOVX    @DPTR,A
```

```
            MOV     DPL,#URTOCTUR    ;LOAD COUNTER/TIMER UPPER
                                     ;REGISTER
            MOV     A,#00H
            MOVX    @DPTR,A

MOV     DPL,#URTOCTLR    ;LOAD C/T REGISTER
            MOV     A,#34H
            MOVX    @DPTR,A          ;GENERATE L6X 2400 BAUD CLOCK

MOV     DPL,#STRCNTO%1   ;
            MOVX    A,@DPTR          ;START COUNTER COMMAND.

MOV     DPL,#URTOCR      ;WRITE TO COMMAND REGISTER(CRA)
            MOV     A,#45H           ;ALSO RESETS ERROR FLAGS
            MOVX    @DPTR,A          ;ALSO ENABLES TRANSMITTER AND
                                     ;RECEIVER.
            RET
;----------------------------------------------------------------
                                     ;THIS RESETS PORT1 HARDWARE.

RES1:       MOV     DPL,#00H         ;DISABLE PORT
            MOV     A,#10H
            MOVX    @DPTR,A

;SET UP UART1B.
                                     ;ASSUMES DPH IS LOADED WITH
                                     ;UPPER ADDRESS

MOV     DPL,#URT1MR      ;MODE REG.A ADDRESS
            MOV     A,#0AH           ;EVEN PARITY, FORCE PARITY,7
                                     ;DATA BITS
            MOVX    @DPTR,A          ;WRITE TO MODE REGISTER 1A.

MOV     A,#0FH
            MOVX    @DPTR,A          ;WRITE TO MODE REGISTER 2A

MOV     DPL,#URT1CSR     ;WRITE TO CLOCK SELECT
                                     ;REG.A(CSRA)

MOV     A,#0DDH          ;SET FOR TIMER AS CLOCK SOURCE
            MOVX    @DPTR,A

MOV     DPL,#URT1ACR     ;WRITE TO AUXILIARY CONTROL
                                     ;REGISTER(ACR)
            MOV     A,#60H
            MOVX    @DPTR,A

MOV     DPL,#URT1CR      ;WRITE TO COMMAND REGISTER(CRA)
            MOV     A,#45H           ;ALSO RESETS ERROR FLAGS
            MOVX    @DPTR,A          ;ALSO ENABLES TRANSMITTER AND
                                     ;RECEIVER.
            RET
;----------------------------------------------------------------
                                     ;THIS RESETS PORT2 HARDWARE.

RES2:       MOV     DPL,#00H         ;DISABLE PORT
            MOV     A,#10H
            MOVX    @DPTR,A
```

```
                                        ;SET UP UART 2A
                                        ;ASSUMES DPH IS LOADED WITH
                                        ;UPPER ADDRESS

MOV     DPL,#URT2MR             ;MODE REG.A ADDRESS
        MOV     A,#0AH                  ;EVEN PARITY, FORCE PARITY,7
                                        ;DATA BITS
        MOVX    @DPTR,A                 ;WRITE TO MODE REGISTER 1A.

MOV     A,#0FH
        MOVX    @DPTR,A                 ;WRITE TO MODE REGISTER 2A
        MOV     DPL,#URT2CSR            ;WRITE TO CLOCK SELECT REG.
                                        ;A(CSRA)
        MOV     A,#0DDH                 ;SET FOR TIMER AS CLOCK SOURCE
        MOVX    @DPTR,A

MOV     DPL,#URT2ACR            ;WRITE TO AUXILIARY CONTROL
                                        ;REGISTER(ACR)
        MOV     A,#60H
        MOVX    @DPTR,A

MOV     DPL,#URT2IMR            ;WRITE TO INTERRUPT MASK
                                        ;REG.((IMR)
        MOV     A,#00H
        MOVX    @DPTR,A
        MOV     DPL,#URT2CTUR           ;LOAD COUNTER/TIMER UPPER
                                        ;REGISTER
        MOV     A,#00H
        MOVX    @DPTR,A

MOV     DPL,#URT2CTUR           ;LOAD C/T LOWER REGISTER
        MOV     A,#34H
        MOVX    @DPTR,A                 ;GENERATE 16X 2400 BAUD CLOCK

MOV     DPL,#STRCNT2%3          ;
        MOVX    A,@DPTR                 ;START COUNTER COMMAND.

MOV     DPL,#URT2CR             ;WRITE TO COMMAND REGISTER(CRA)
        MOV     A,#45H                  ;ALSO RESETS ERROR FLAGS
        MOVX    @DPTR,A                 ;ALSO ENABLES TRANSMITTER AND
                                        ;RECEIVER.
        RET
;--------------------------------------------------------------------
                                        ;THIS RESETS PORT3 HARDWARE.
RES3:   MOV     DPL,#00H                ;DISABLE PORT
        MOV     A,#10H
        MOVX    @DPTR,A

;SET UP UART 2B
                                        ;ASSUMES DPH IS LOADED WITH
                                        ;UPPER ADDRESS.

MOV     DPL,#URT3MR             ;MODE REG.A ADDRESS
        MOV     A,#0AH                  ;EVEN PARITY, FORCE PARITY,7
                                        ;DATA BITS
        MOVX    @DPTR,A                 ;WRITE TO MODE REGISTER 1A.

MOV     A,#0FH
        MOVX    @DPTR,A                 ;WRITE TO MODE REGISTER 2A
```

```
        MOV      DPL,#URT3CSR    ;WRITE TO CLOCK SELECT REG.
                                 ;A(CSRA)
        MOV      A,#0DDH         ;SET FOR TIMER AS CLOCK SOURCE
        MOVX     @DPTR,A

MOV      DPL,#URT3ACR    ;WRITE TO AUXILIARY CONTROL
                                 ;REGISTER(ACR)
        MOV      A,#60H
        MOVX     @DPTR,A
        MOV      DPL,#URT3CR     ;WRITE TO COMMAND REGISTER
                                 ;(CR)
        MOV      A,#45H          ;ALSO RESETS ERROR FLAGS
        MOVX     @DPTR,A         ;ALSO ENABLES TRANSMITTER AND
                                 ;RECEIVER.
        RET
```

```
;-----------------------------------------------------------------
;THIS MODULE WILL CONTAIN THE MAIN PORTION OF THE MUX FIRMWARE.
;IT WILL CONSIST PRIMARILY OF THE PORT POLLING ROUTINES.
;-----------------------------------------------------------------

MAIN:     MOV     VAR1,#00H       ;VAR1 WILL CONTAIN IF BOARD
                                  ;No.(0-8)
                                  ;VAR2 WILL CONTAIN PORT
                                  ;No.(0-3)

ONLINE?:  MOV     A,#TERAO        ;LOAD TERA-ONLINE TABLE
                                  ;POINTER.
          ADD     A,VAR1          ;ADD ENTRY No. OFFSET TO TABLE
                                  ;BASE ADDRESS
          MOV     R0,A            ;LOAD ADDRESS POINTER OF
                                  ;CURRENT ENTRY TO R0.
          MOV     A,@R0           ;MOVE CONTENT OF TABLE ENTRY TO
                                  ;ACC.
                                  ;00H=ON-LINE, 0FFH=OFF-LINE.
          JNZ     OFFLINE         ;IF CONTENT OF TABLE ENTRY IS
                                  ;NOT
          CALL    PORTS           ;00H, THEN IT MEANS BOARD IS
                                  ;NOT IN PLACE
          INC     VAR1            ;OTHERWISE CONTINUE, AND POLL
                                  ;BOARD PORT.
          MOV     A,VAR1
          CJNE    A,09H,ONLINE?
          RET                     ;WHEN CHECKED ALL 8 BOARDS THEN
                                  ;RETURN.

TABLE:    AJMP    PPORT0          ;TABLE USED TO JUMP TO PORT
                                  ;ROUTINES.
          AJMP    PPORT1
          AJMP    PPORT2
          AJMP    PPORT3

COMPLETED:
          RET                     ;ALL DONE SERVICING 4 PORTS,
                                  ;RETURN

PORTS:    MOV     VAR2,#00H       ;START BY SERVICING PORT 0.
          JMP     SS
```

```
NPORT:      INC       VAR2

SS:         CJ..      A,04H,COMPLETE
            MOV       DPTR,#TABLE
            JMP       @A+DPTR             ;CHOOSE ONE OF FOUR SERVICE
                                          ;ROUTINES.
                                          ;FROM HERE THE PORT SERVICE
                                          ;ROUTINES ARE CALLED.

;RO...INE CALLED BY PORT SERVICE
                                          ;PROGRAMS IT ASSUMES DPH, AND
                                          ;DPL ARE ALREADY LOADED WITH
                                          ;APPROPRIATE ADDRESS.

MESS:       MOVX      A,@DPTR             ;THIS ROUTINE ASSUMES VAR5
                                          ;CONTAINS CHAR TO BE SENT, AND
                                          ;DPL AND DPH ARE ALREADY
                                          ;INITIALIZED.
            ANL       A,#04H              ;SEE IF TRANSMITTER IS READY.
            CJNE      A,#04H,MESS

MOV       A,DPL
            ADD       A,#20H
            MOV       DPL,A

MOV       A,VAR5
            MOVX      @DPTR,A
            RET

ERRORO:     MOV       R0,#URTOCR          ;READY TO WRITE TO COMMAND
                                          ;REGISTER.
            MOV       A,#00H              ;RESET ERROR FLAGS
            MOVX      @R0,A
            MOV       R0,#URTISR          ;SEE IF TRANSMITTER IS READY.

WAITO:      MOVX      A,@R0
            ANL       A,#04H
            CJNE      A,#04H,WAITO
            MOV       DPL,#URTOSR
            MOV       VAR5,#'X'
            CALL      MESS
            JMP       MOREDATA?           ;CHECK FOR MORE DATA

PPORTO:                                   ;SHOULD RELOAD DPH WITH UPPER
                                          ;BYTE ADDRESS

MOV       A,VAR1
            ORL       A,70H
            MOV       DPH,A

;CHECK FOR RECEIVED DATA.

MOREDATA?:
            MOV       DPL,#URTOSR
            MOVX      A,@DPTR
            MOV       R1,A                ;SAVE STATUS REGISTER IN R1
            ANL       A,#01               ;SEE IF RECEIVED CHARACTER.
            JZ        NPORT               ;IF NOT, THEN CHECK NEXT PORT.

MOV       A,R1                ;RELOAD R1 WITH STATUS REGISTER
```

```
        ANL     A,#0F2H             ;SEE IF RECEIVED CHARACTER HAS
                                    ;ANY ERROR CONDITIONS.
        JNZ     ERRORO              ;IF ANY ERRORS THEN BRANCH.

;IF NO ERRORS, THEN READ
                                    ;CHARACTER.
        MOV     DPL,#URTORHR
        MOVX    A,@DPTR
        MOV     VAR3,A              ;SAVE RECEIVED CHAR.

MOV     B,VAR1              ;SEE IF PORT IS ALREADY
                                    ;ATTACHED TO TERA CHANNEL.
        MOV     A,#04H              ;CALCULATE PORT ADDRESS.
                                    ;(VAR1X4+VAR2) NEED TABLE
                                    ;POINTER OF ADDRESS REG. TO
                                    ;ACCESS PORT ATTACHED FLAG.

MUL     AB
        ADD     A,VAR2
        ADD     a,#PICO             ;NOW POINTING TO TABLE ENTRY.
        MOV     RO,A
        MOV     VAR4,A              ;SAVE POINTER IN VAR4.
        MOV     A,@RO
        ANL     A,OFH               ;MASK OUT LOWER NIBBLE.
        JZ      NOTATTACHED

MOV     A,VAR3              ;RELOAD CHAR. INTO ACC.
        CJNE    A,#'D',MOREDATA?    ;IF NOT "D", GO TO NEXT
                                    ;PORT. IF 'D', THEN
                                    ;UNATTACH. SEND 'K'
        MOV     A,@RO               ;RO IS STILL POINTING AT
                                    ;ADDRESS REGISTER ENTRY.
        ANL     A,OFH               ;FIRST MARK PORT AS
                                    ;UNATTACHED.
        MOV     @RO,A               ;SAVE BACK INTO ENTRY
        ADD     A,#'F2'             ;NOW POINT INTO CHANNEL
                                    ;REGISTER ENTRY.
        MOV     RO,A                ;LOAD RO, WITH CHANNEL
                                    ;REG. OFFSET OF CURRENT
                                    ;ENTRY
        MOV     A,#0FFH
        MOV     @RO,A               ;MARK ENTRY AS OPEN.
                                    ;(OFFH=OPEN)
        MOV     DPL,#00H            ;NEXT DISCONNECT CHANNEL.
        MOV     A,#10H
        MOVX    @DPTR,A

MOV     DPL,#URTOSR
        MOV     VAR5,#'K'
        CALL    MESS

MOV     DPL,#URTOSR
        MOV     VAR5,#'D'
        CALL    MESS                ;TRANSMIT BACK A.D.
        JMP     MOREDATA?
NOTATTACHED:
```

```
        MOV     A,VAR3              ;LOAD RECEIVED CHAR. INTO
                                    ;ACC.
        CJNE    A,'A',NUMB          ;IF NOT EQUAL, THEN SEE IF
                                    ;NUMBER.
        MOV     B,VAR1              ;LOOK UP ATTACH ADDRESS IN
                                    ;ADDRESS REG., LOWER
                                    ;NIBBLE.
        MOV     A,#04H              ;CALCULATE PORT ADDRESS.
                                    ;(VAR1X4+VAR2) NEED TABLE
                                    ;POINTER OF ADDRESS REG.
                                    ;TO ACCESS ATTACH ADDRESS.
        MUL     AB
        ADD     A,VAR2
        ADD     A,#PICO             ;NOW POINTING TO TABLE
                                    ;ENTRY.
        MOV     R0,A
        MOV     A,@R0
        ANL     A,#0FFH             ;ATTACH ADDRESS IS NOW IN
                                    ;ACC.
        MOV     VAR3,A              ;SAVE IN VAR3
        ADD     A,#TERA0            ;SEE IF DEVICE IS ON-LINE.
        MOV     R0,A
        MOV     A,@R0
        JZ      DEVON               ;IF 00H, THE DEVICE IS ON-
                                    ;LINE.  IF NOT, THEN
                                    ;DEVICE NOT ATTACHED.
        MOV     DPL,#URTOSR
        MOV     VAR5,#'K'
        CALL    MESS
        MOV     DPL,#URTOSR
        MOV     VAR5,#'U'
        CALL    MESS                ;RETURN U.
        JMP     MOREDATA?

N:      MOV     A,VAR3              ;DEVICE IS ON-LINE
        ADD     A,#CHAN0            ;SEE IF DEVICE IS OPEN.
        MOV     R0,A
        MOV     A,@R0
        CJNE    A,#0FFH,BUSY0?      ;IF NOT FFH, THEN MAY BE
                                    ;BUSY.
                                    ;IT IS OPEN, ATTACH.
        MOV     DPL,#URTOSR
        MOV     VAR5,#'K'
        CALL    MESS
        MOV     DPL,#URTOSR
        MOV     VAR5,#'D'
        CALL    MESS                ;RETURN DONE MESSAGE.

MOV     A,VAR3              ;VAR3 CONTAINS ATTACH
                                    ;ADDRESS.
        MOV     DPL,00H
        MOVX    @DPTR,A             ;ATTACH
        MOV     A,AR1
```

|         | SWAP | A          | ;PUT IF ADDRESS |
|---------|------|------------|-----------------|
|         | ORL  | A,VAR2     | ;THIS IS NEW DATA TO BE |
|         |      |            | ;WRITTEN INTO THE CHANNEL |
|         |      |            | ;REG. |
|         | XCH  | A,VAR3     | |
|         | ADD  | A,CHANO    | |
|         | MOV  | RO,A       | |
|         | MOV  | A,VAR3     | |
|         | MOV  | @RO,A      | ;UPDATES NEW CHANNEL |
|         |      |            | ;REGISTER. |
|         | MOV  | RO,VAR4    | |
|         | MOV  | A,@RO      | ;LOAD CONTENTS OF ADDRESS |
|         |      |            | ;REGISTER. |
|         | ORL  | A,#OFOH    | ;THIS MARKS PORT AS |
|         |      |            | ;ATTACHED. |
|         | JMP  | MOREDATA?  | |
| BYSO?:  | MOV  | DPL,#URTOSR | |
|         | MOV  | VAR5,#'K'  | ;RETURN SYNTAX OK STATUS. |
|         | CALL | MESS       | |
|         | MOV  | DPL,#URTOSR | |
|         | MOV  | VAR5,#'B'  | |
|         | CALL | MESS       | ;RETURN BUSY STATUS. |
|         | JMP  | MOREDATA?  | |
| NUMB:   | MOV  | A,#037H    | ;NUMBER TO SUBSTRACT FROM. |
|         | CLR  | C          | ;CLEAR CARRY BIT |
|         | CLR  | PSW.2      | ;CLEAR OVERFLOW BIT(OV) |
|         | CLR  | PSW.6      | ;CLEAR AC(AUXILIARY CARRY |
|         |      |            | ;BIT) |
|         | SUBB | A,VAR3     | ;37H-VAR3, SEE IF CHAR IS |
|         |      |            | ;GREATER THAN |
|         | JBC  | PSW.2,NOTNUM | ;IF OV BIT SET, THEN IS |
|         |      |            | ;NEGATIVE RESULT, RESET OV |
|         |      |            | ;AND BRANCH. IT MEANS |
|         |      |            | ;CHAR IS NOT VALID NUMBER. |
|         | MOV  | A,VAR3     | |
|         | CLR  | C          | |
|         | CLR  | PSW.6      | |
|         | SUBB | A,#30!!    | ;SEE IF VALID NUMBER BET |
|         |      |            | ;30H AND 37H. |
|         | JBC  | PSW.2,NOTNUM | ;IF OV SET, THEN NOT VALID |
|         |      |            | ;NUMBER |
|         | MOV  | RO,VAR4    | |
|         | MOV  | VAR5,A     | ;TEMPORARILY SAVE ACC. |
|         | MOV  | A,@RO      | |
|         | ANL  | A,#OFOH    | |
|         | ORL  | A,VAR5     | |
|         | MOV  | @RO,A      | ;SAVE NEW ADDRESS IN |
|         |      |            | ;TABLE. |
|         | JMP  | MOREDATA?  | |
| NOTNUM: | MOV  | DPL,#URTOSR | |
|         | MOV  | VAR5,#'X'  | |
|         | CALL | MESS       | |
|         | JMP  | MOREDATA?  | |

What is claimed is:

1. An image storage and display system comprising:
   a plurality of image storage devices, each including a scanner for generating serial bit-mapped image data and each coupled to a channel dedicated to the image storage device, data being, transferred over each channel in a serial transfer of the bit-mapped data;
   a plurality of workstation computers for receiving the serial bit-mapped image data; and
   an image transfer controller responsive to requests from each of the workstation computers and having interconnecting means for selectively interconnecting any single workstation computer to any single channel and for simultaneously transferring serial bit-mapped image data between channels and computer workstations of plural pairs of channels and computer workstations which are interconnected, each channel comprising a data line for the serial bit-mapped image data and a clock line for carrying clock signals, both the image data and the clock signals being transferred through the interconnecting means of the image transfer controller to the workstation computers on data and clock lines dedicated to the workstation computers, and each channel comprising command and response lines, the command and response lines being coupled through the interconnecting means of the image transfer controller to the workstation computers through lines dedicated to the workstation computers, each workstation computer making requests to the controller on a request line of the workstation computer for interconnection with one of the channels and thereafter making requests, on the request line and the request line of the channel, to the image storage device for data, and the image storage device making responses, other than the transfer of image data, to the workstation computer through its dedicated response line, the response and request lines carrying signals at rates which are low relative to the rates at which image data and clock signals are transferred on the data lines and clock lines.

2. A system as claimed in claim 1 further comprising a central computer coupled to each of the workstation computers.

* * * * *